US 6,703,634 B2

(12) United States Patent
Ono

(10) Patent No.: US 6,703,634 B2
(45) Date of Patent: Mar. 9, 2004

(54) 3D-SHAPE MEASUREMENT APPARATUS

(75) Inventor: Yuji Ono, Ehime (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 237 days.

(21) Appl. No.: 10/011,280

(22) Filed: Dec. 11, 2001

(65) Prior Publication Data

US 2002/0122185 A1 Sep. 5, 2002

(30) Foreign Application Priority Data

Dec. 11, 2000 (JP) ........................................ 2000-376406

(51) Int. Cl.[7] .............................................. G01B 11/24
(52) U.S. Cl. ............................ 250/559.19; 250/559.22; 356/601
(58) Field of Search ....................... 250/559.19, 559.21, 250/559.22, 559.23, 559.27, 201.2; 356/601, 602, 606, 607, 612, 624

(56) References Cited

U.S. PATENT DOCUMENTS

| 5,004,929 | A | | 4/1991 | Kakinoki et al. |
| 5,780,866 | A | * | 7/1998 | Yamamura et al. .... 250/559.22 |
| 5,812,269 | A | | 9/1998 | Svetkoff et al. |
| 6,388,754 | B1 | * | 5/2002 | Nishikawa et al. ......... 356/601 |
| 6,396,589 | B1 | * | 5/2002 | Ebihara ...................... 356/601 |

* cited by examiner

Primary Examiner—Kevin Pyo
(74) Attorney, Agent, or Firm—Wenderoth, Lind & Ponack, L.L.P.

(57) ABSTRACT

In a 3D-shape measurement apparatus, a photoreceptive optical system for linearly scanning a target-to-be-measured with a scanning light beam and guiding a reflected light beam from the object to a scanning convergence lens is constituted such that the position of an apparent emission point of the reflected light to be incident on the scanning convergence lens moves in the same direction as the direction along which the scanning light beam deviates due to deformation of a scanning optical system, and the apparent emission point is always positioned on a scanning plane even when the scanning position varies.

28 Claims, 19 Drawing Sheets

3D-SHAPE MEASUREMENT APPARATUS

FIELD OF THE INVENTION

The present invention relates to 3D-shape measurement apparatuses and, more particularly, to a 3D-shape measurement apparatus which can suppress a reduction in measurement accuracy due to deformation of a scanning optical system, and variations in height accuracy depending on scanning positions, when the apparatus measures the 3D-shape of an object by linearly scanning the object with a laser beam or the like, employing a polarization/scanning/convergence means such as a polygon mirror and a fθ lens, and then measuring the reflected light of the scanning light on the basis of the principle of triangulation.

BACKGROUND OF THE INVENTION

Conventional methods for geometric-optically measuring a 3D-shape are roughly classified into two methods as follows: a method of projecting various kinds of lights to an object, and measuring the reflected lights with a photodetector, and a method of measuring an object with cameras from multiple directions under natural light or normal lighting, and obtaining the 3D-shape of the object according to the correlation between plural images.

The former method is further classified into various methods according to the method of light projection, the type of the photodetector, and the positional relationship between a light source and the photodetector.

FIG. 14 is a schematic diagram illustrating a conventional 3D-shape measurement apparatus which is widely used for industrial equipment.

With reference to FIG. 14, a light beam emitted from a light source 1 is polarized with a rotating mirror 2 such as a polygon mirror, and a scanning light beam 4 is converged by a convergence/scanning lens 3 such as a fθ lens to form a spot light 6a on a target 5 to be measured. With rotation of the rotating mirror 2, the spot light 6a scans the target 5 along a straight line (hereinafter referred to as a scanning line 7) up to a spot 6b.

Among light beams irregularly reflected at the surface of the target 5, a reflected beam 8 traveling in the direction different from the direction of the scanning beam 4 is focused to form an image on a position detector 10 such as a PSD or CCD camera through a photoreceptive optical system 9, and height data of a point irradiated with the spot light 6 is obtained by triangulation from position data of the image, which is obtained by converting the reflected light 8 into an electric signal.

The spot light 6 scans the target 5 along the scanning line 7, and the target 5 moves in synchronization with rotation of the rotating mirror 2, in the direction (sub scanning direction 12) perpendicular to a plane which is formed by the direction of the scanning line 7 (main scanning direction 11) and the direction 40 along which the scanning light 4 travels, whereby the spot light 6 scans the target 5 two-dimensionally, and the stereoscopic 3D shape of the target 5 is measured by storing and arranging the height data at the respective scanning positions on a memory.

FIGS. 15(a)–15(c) are diagrams for explaining problems of the height measurement by triangulation, in the conventional 3D-shape measurement apparatus.

Since, in the height measurement by triangulation, the reflected light is measured from the direction different from the direction of the scanning light 4, it is affected by the shape of the target 5 or the distribution of reflectivity. Accordingly, a blind spot occurs as shown in FIG. 15(a), or a height measurement error due to multiple reflection occurs as shown in FIG. 15(b).

FIG. 15(c) shows the case where the reflected light is measured from plural directions.

In FIG. 15(c), when the shape of the target 5 is complicated or the luminance change is considerable, reflected light beams 8a (a blind spot occurs), 8b (double-reflection occurs), 8c (no influence by the target 5), . . . are measured, and a height output value obtained from the reflected light beam 8c which is measured in the direction where no blind spot and no multiple reflection occur, must be selected.

FIG. 16 is a cross-sectional view illustrating the relationship between the scanning position and the image position of received light in the conventional 3D-shape measurement apparatus, for explaining the problems of triangulation in the case where the spot light 6 scans on the scanning line 7.

With reference to FIG. 16, in the conventional 3D-shape measurement apparatus, when the reflected light 8 from the target 5 is guided to the position detector 10 through a photoreceptive optical system 9 which is independent of the scanning optical system comprising the rotating mirror 2 and the convergence/scanning lens 3, the image position on the position detector 10 moves according to the scanning position, resulting in a height change H. Therefore, a position detector wider than the height measurement range is required, leading to degradation in performance, such as a reduction in measurement accuracy or a reduction in processing speed.

FIG. 17 is a perspective view illustrating the structure of the conventional 3D-shape measurement apparatus wherein the scanning optical system is included in the photoreceptive optical system.

With reference to FIG. 17, the photoreceptive optical system 9 shown in FIG. 14 is divided into a photoreceptive optical system 9a and a photoreceptive optical system 9b, and the scanning optical system is placed between the photoreceptive optical system 9a and the photoreceptive optical system 9b.

The reflected light 8 reaches the position detector 10 through the scanning optical system, and a movement of the reflected light 8 according to the scanning position is canceled by the scanning optical system. Then, a movement of the image on the position detector 10 is mainly caused by a height change of the target 5, whereby the height measurement accuracy is increased, resulting in improved performance.

Furthermore, there is a 3D-shape measurement apparatus which solves the problems of triangulation shown in FIG. 15(c) by providing plural sets of the photoreceptive optical system 9a, the photoreceptive optical system 9b, and the position detector 10 shown in FIG. 17, and measuring the reflected light 8 from the target 5 from multiple directions.

The conventional 3D-shape measurement apparatuses are constructed as described above.

FIGS. 18(a) and 18(b) are diagrams for explaining a positional deviation of spot light, and a height error.

In the case where the conventional 3D-shape measurement apparatus measures the reflected light from multiple directions by straight-line scanning employing the scanning optical system to perform 3D-shape measurement by triangulation, when the photoreceptive optical system 9 which measures the reflected light 8 does not change and only the position of the spot light 6 on the target 5 changes from point A to point B as shown in FIG. 18(*a*), the image position on the position detector 10 changes from A' to B', whereby the height of the target 5 cannot be measured accurately.

Especially when the spot light 6 is guided to the target 5 through the scanning optical system which comprises the polarization means by the rotating mirror such as a polygon mirror or a galvano mirror, and the convergence/scanning lens such as a fθ lens, deterioration of the rotating part of the rotating mirror or deformation of the fθ lens holder causes a deviation in the angle or position of the optical axis of the scanning light 4 with a change in environment such as temperature or with the passage of time, whereby the position of the spot light 6 changes, resulting in a difficulty in performing accurate height measurement.

Furthermore, in the case where the reflected light 8 is measured from multiple directions to accurately measure the height of the target 5 having a complicated shape as shown in FIG. 15(*c*), when the position of the spot light 6 changes from point A to point B as shown in FIG. 18(*b*), the image position on the position detector 10R changes from A' to B' when the reflected light is received by the photoreceptive optical system 9R and the position detector 10R, and the target 5 is apparently positioned at a height of point C', resulting in an error h' of the measured height.

On the other hand, when the reflected light is received by the photoreceptive optical system 9L and the position detector 10L, the image changes from A" to B", and the target 5 is apparently positioned at point C", resulting in an error h" of the measured height, which error is opposite to the height error h' in regard to positive/negative and is different in size from the height error h'.

Since the direction and degree of the height error due to a positional deviation of the spot light 6 differ according to the direction of the reflected light, the error might be increased when selecting an accurate height of the target 5 from plural height data, leading to a fear that the height measurement accuracy is degraded.

As described above, when the height measurement by triangulation is carried out, a change in the position or angle of the spot light 6 must be suppressed to achieve highly accurate measurement. Therefore, in the case where scanning is carried out with the spot light 6 using the scanning optical system as described above, various restrictions are imposed on the height measurement as follows. A special scanning optical system for suppressing the influence of the angle change of the rotating mirror must be constituted, or deformation of the scanning optical system must be suppressed by restricting the usage environment, or periodical maintenance for correcting the height error must be carried out.

Further, the conventional 3D-shape measurement apparatus shown in FIG. 17 in which, in order to suppress a movement of the image according to the scanning position, the photoreceptive optical system 9 is divided into the photoreceptive optical system 9*a* and the photoreceptive optical system 9*b*, and the scanning optical system is placed between the photoreceptive optical systems 9*a* and 9*b*, and the reflected light 8 is guided to the position detector 10 through the scanning optical system, has the following problems.

FIG. 19 is a diagram illustrating a change in accuracy of height measurement according to the scanning position, in the conventional 3D-shape measurement apparatus.

With reference to FIG. 19, when the reflected light 8 of the spot light 6 is guided through the photoreceptive optical system 9*a* to the scanning optical system comprising the rotating mirror 2 and the convergence/scanning lens 3, the reflected light 8 curves in the path to the scanning optical system and travels an excess distance, or the spreading angle of the reflected light 8 changes in the photoreceptive optical system 9*a*, whereby the apparent light-emission point 13 of the reflected light 8 incident on the scanning/convergence lens 3 is not positioned on the scanning plane 16 on which the spot light 6 passing through the scanning/convergence lens 3 is focused.

In the case of a general scanning optical system, it is not guaranteed that a distance Ldr to the apparent focal point 14 of the reflected light 8 which has passed through the scanning optical system comprising the convergence lens 3 and the rotating mirror 2 is always constant regardless of the scanning position. At this time, a distance Lds to the apparent light-emission point 15 of the light which is emitted from the light source 1 to be inputted to the scanning convergence lens 3 is always constant regardless of the scanning position, whereby the position of the apparent focal point 14 varies while the position of the light-emission point 15 does not vary.

That is, since the focal point 14 of the reflected light 8 converged by the photoreceptive optical system 9*b*, and the distance to the photoreceptive surface of the position detector 10 vary according to the scanning position, the size of the image on the position detector 10 also varies. As the image size increases, the height measurement accuracy is degraded. Therefore, the height measurement accuracy also varies according to the scanning position.

As the result, even when the height measurement accuracy is maximized by minimizing the image size on the position detector 10 at a certain scanning position, the image size is large and a reduction in accuracy occurs at another scanning position, resulting in a reduction in the total height accuracy. Therefore, to maintain the height accuracy high, it is necessary to devise a scanning optical system considering a special photoreceptive performance, resulting in restrictions on design.

SUMMARY OF THE INVENTION

The present invention is made to solve the above-described problems and has for its object to provide a 3D-shape measurement apparatus whose accuracy of measurement is not reduced even when a scanning optical system comprising a rotating mirror and a scanning convergence lens deforms and the position of a spot light deviates, and a 3D-shape measurement apparatus which can suppress variations in height accuracy, without the necessity of employing a scanning optical system considering a special photoreceptive performance.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, there is provided a 3D-shape measurement apparatus which detects a reflected light obtained by irradiating an object as a target of measurement with a scanning light beam by employing an optical position detector, and measures the 3D-shape of the object from the result of detection at each scanning position, and the apparatus comprises means for generating a light beam; polarization scanning means for polarizing the light beam to make the light beam perform scanning; scanning convergence means for converging the light beam which has passed through the polarization scanning means; and reflected light path changing means for guiding the reflected light from the target object located on a locus (hereinafter referred to as a scanning line) which is drawn by a focal point of the light beam (hereinafter referred to as a scanning light beam) which has passed through the scanning convergence means, toward the scanning convergence means and the polarization scanning means, to make the reflected light incident on the optical position detector, and changing, when the object moves in a direction perpendicular to both of the scanning light beam and the scanning line (hereinafter referred to as a sub scanning direction), the optical path of the reflected light so that the direction of a movement of the image obtained by the optical position detector in the sub scanning direction becomes the same as the direction of the movement of the object, and the moving distance of the image becomes less than twice as long as the moving distance of the object. Therefore, the position of the apparent focal point of the reflected light emitted from the scanning optical system, relative to the light source, becomes approximately constant regardless of deformation of the scanning optical system, whereby variations in the position of the image on the position detector are suppressed, and errors in measured heights are reduced.

According to a second aspect of the present invention, in the 3D-shape measurement apparatus according to the first aspect, the reflected light path changing means is constituted by an even number of, at least two, mirrors which are placed parallel to the scanning line. Therefore, errors in measured heights, which are caused by deformation of the scanning optical system, can be easily reduced by the combination of simple mirrors.

According to a third aspect of the present invention, in the 3D-shape measurement apparatus according to the second aspect, the relationship of relative positions between the mirrors is always kept constant. Therefore, even when the whole reflected light path changing means rotates about the axis of the main scanning direction, the positions of the apparent emission points of the reflected lights emitted from the reflected light path changing means become approximately the same, whereby errors in measured heights can be reduced.

According to a fourth aspect of the present invention, in the 3D-shape measurement apparatus according to the first aspect, the reflected light path changing means is constituted by a wedge-shaped prism having a light-incident surface and a light-outgoing surface which are parallel to the scanning line. Therefore, errors in measured heights, which are caused by deformation of the scanning optical system, can be easily reduced by the simple component. Furthermore, even when the whole reflected light path changing means rotates about the axis of the direction along which the scanning light travels, the positions of the apparent emission points of the reflected lights emitted from the reflected light path changing means become approximately the same, whereby variations in height data can be reduced.

According to a fifth aspect of the present invention, in the 3D-shape measurement apparatus according to the first aspect, the reflected light path changing means is constituted by a cylindrical lens which extends in the direction of the scanning line. Therefore, errors in measured heights, which are caused by deformation of the scanning optical system, can be easily reduced by the simple component. Furthermore, even when the whole reflected light path changing means rotates about the axis of the direction along which the scanning light travels, the positions of the apparent emission points of the reflected lights emitted from the reflected light path changing means become approximately the same, whereby variations in height data can be reduced.

According to a sixth aspect of the present invention, in the 3D-shape measurement apparatus according to the first aspect, the reflected light path changing means is constituted by a sheet-shaped optical element which refracts light. Therefore, errors in measured heights, which are caused by deformation of the scanning optical system, can be easily reduced by a single component. Furthermore, even when the whole reflected light path changing means rotates about the axis of the direction along which the scanning light travels, the positions of the apparent emission points of the reflected lights emitted from the reflected light path changing means become approximately the same, whereby variations in height data can be reduced. Moreover, restrictions on the placement of the reflected light path changing means are reduced, and the degree of freedom in design is increased, whereby more appropriate design is realized.

According to a seventh aspect of the present invention, in the 3D-shape measurement apparatus according to the third aspect, the even number of mirrors constituting the reflected light path changing means are formed at inner surfaces of a single prism body, and a correction prism for reducing an aberration of the image formed by focusing the reflected light on the optical position detector, is placed between the scanning convergence means and the optical position detector. Therefore, when the reflected light is diagonally incident on the light-incident surface or light-emission surface of the reflected light path changing means constituted by the prism, an aberration caused by the diagonal light incidence is corrected, whereby the size of the image on the position detector is reduced, and the accuracy of height measurement is improved.

According to an eighth aspect of the present invention, in the 3D-shape measurement apparatus according to the fourth or sixth aspect, a correction prism for reducing an aberration of the image formed by focusing the reflected light on the optical position detector, is placed between the scanning convergence means and the optical position detector. Therefore, when the reflected light is diagonally incident on the light-incident surface or light-emission surface of the reflected light path changing means constituted by the prism, an aberration caused by the diagonal light incidence is corrected, whereby the size of the image on the position detector is reduced, and the accuracy of height measurement is improved.

According to a ninth aspect of the present invention, in the 3D-shape measurement apparatus according to the fifth aspect, a cylindrical lens for reducing an aberration of the image formed by focusing the reflected light on the optical position detector, is placed between the scanning convergence means and the optical position detector. Therefore, when the reflected light is incident on the reflected light path changing means constituted by the cylindrical lens, an astigmatic aberration caused by the light incidence is corrected, whereby the size of the image on the position detector is reduced, and the accuracy of height measurement is improved.

According to a tenth aspect of the present invention, there is provided a 3D-shape measurement apparatus which detects a reflected light that is obtained by irradiating an object as a target of measurement with a scanning light beam by employing an optical position detector, and measures the 3D-shape of the object from the result of detection at each scanning position, and the apparatus comprises means for generating a light beam; polarization scanning means for polarizing the light beam to make the light beam perform scanning; scanning convergence means for converging the light beam which has passed through the polarization scanning means; and reflected light path changing means for guiding the reflected light from the target object located on a locus (hereinafter referred to as a scanning line) which is drawn by a focal point of the light beam (hereinafter referred to as a scanning light beam) which has passed through the scanning convergence means, toward the scanning convergence means and the polarization scanning means, to make the reflected light incident on the optical position detector, and changing the optical path of the reflected light so that an apparent emission point of the reflected light incident on the scanning convergence means is always positioned on a plane (hereinafter referred to as a virtual scanning plane) which passes through a locus drawn by an apparent focal point of the scanning light beam emitted from the scanning convergence means and is perpendicular to the scanning light beam. Therefore, the relative positions between the apparent focal point of the reflected light which is emitted from the scanning optical system and the apparent light-emission point of the light beam which is emitted from the light source become approximately constant regardless of the scanning position, whereby variations in the image size on the position detector according to the scanning position are reduced, and the accuracy of height measurement is improved.

According to an eleventh aspect of the present invention, the 3D-shape measurement apparatus according to the tenth aspect further includes converging distance changing means for changing the converging distance of the scanning light beam, which means is placed in an optical path along which the scanning light beam passing through the scanning convergence means reaches the scanning plane. Therefore, the position of the apparent scanning plane viewed from the scanning convergence means moves to the apparent emission point of the reflected light viewed from the scanning convergence means, whereby stable height measurement can be always carried out regardless of the scanning position.

According to a twelfth aspect of the present invention, in the 3D-shape measurement apparatus according to an eleventh aspect, the converging distance changing means is constituted by at least three mirrors which are parallel to the scanning line. Therefore, when the apparent emission point of the reflected light is shifted in the scanning light traveling direction with respect to the scanning plane, the position of the apparent scanning plane viewed from the scanning convergence means can be moved in the scanning light traveling direction so as to match the position of the apparent scanning plane with the position of the apparent emission point of the reflected light, whereby stable height measurement can be always carried out regardless of the scanning position.

According to a thirteenth aspect of the present invention, in the 3D-shape measurement apparatus according to the eleventh aspect, the converging distance changing means is constituted by parallel glasses having a light-incident surface and a light-emission surface which are parallel to the scanning line. Therefore, when the apparent emission point of the reflected light is shifted in the direction opposite to the scanning light traveling direction with respect to the scanning plane, the position of the apparent scanning plane viewed from the scanning convergence means can be moved in the direction opposite to the scanning light traveling direction with respect to the scanning plane so as to match the position of the apparent scanning plane with the position of the apparent emission point of the reflected light, whereby stable height measurement can be always carried out regardless of the scanning position.

According to a fourteenth aspect of the present invention, the 3D-shape measurement apparatus according to the tenth aspect further includes reflected light emission point distance changing means for changing the distance up to an apparent emission point of the reflected light, which means is placed in an optical path along which the reflected light from the target object reaches the scanning convergence means. Therefore, the position of the apparent emission point of the reflected light viewed from the scanning convergence means can be moved to the scanning plane, whereby stable height measurement can be always carried out regardless of the scanning position.

According to a fifteenth aspect of the present invention, in the 3D-shape measurement apparatus according to the fourteenth aspect, the reflected light emission point distance changing means is constituted by at least three mirrors which are parallel to the scanning line. Therefore, when the apparent emission point of the reflected light is shifted in the direction opposite to the scanning light traveling direction with respect to the scanning plane, the position of the apparent emission point can be moved in the scanning light traveling direction with respect to the scanning plane so as to match the position of the apparent emission point of the reflected light with the position of the apparent scanning plane, whereby stable height measurement can be always carried out regardless of the scanning position.

According to a sixteenth aspect of the present invention, in the 3D-shape measurement apparatus according to the fourteenth aspect, the reflected light emission point distance changing means is constituted by parallel glasses having a light-incident surface and a light-emission surface which are parallel to the scanning line. Therefore, when the apparent emission point of the reflected light is shifted in the scanning light traveling direction with respect to the scanning plane, the position of the apparent light-emission point can be moved in the direction opposite to the scanning light traveling direction with respect to the scanning plane so as to match the apparent emission point of the reflected light with the position of the scanning plane, whereby stable height measurement can be always carried out regardless of the scanning position.

According to a seventeenth aspect of the present invention, in the 3D-shape measurement apparatus according to the fourteenth aspect, the reflected light emission point distance changing means is constituted by a cylindrical lens extending in the direction of the scanning line. Therefore, when the apparent emission point of the reflected light is not positioned on the scanning plane, the position of the apparent emission point is moved with respect to the scanning plane so that the apparent emission point of the reflected light is positioned on the scanning plane, whereby stable height measurement can be always carried out regardless of the scanning position.

According to an eighteenth aspect of the present invention, in the 3D-shape measurement apparatus according to the sixteenth aspect, the parallel glasses constituting the reflected light emission point distance changing means are provided with an even number of, at least two, mirrors at the inner surfaces, which mirrors are placed parallel to the scanning line, whereby the parallel glasses are integrated with each other. Therefore, the number of parts can be reduced by integrating plural means having different functions, whereby the parts cost and the man-hours required for assembly and adjustment are reduced, resulting in a reduction in the total cost.

According to a nineteenth aspect of the present invention, in the 3D-shape measurement apparatus according to the eighteenth aspect, the integrated parallel glasses constituting the reflected light path changing means have a light-incident surface and a light-emission surface which are parallel to the scanning line and change the converging distance of the scanning light beam. Therefore, the number of parts can be reduced by integrating plural means having different functions, whereby the parts cost and the man-hours required for assembly and adjustment are reduced, resulting in a reduction in the total cost.

According to a twentieth aspect of the present invention, in the 3D-shape measurement apparatus according to the fourth, sixth, or eighth aspect, the reflected light emission point distance changing means for changing the distance up to the apparent emission point of the reflected light is integrated with the prism constituting the reflected light path changing means. Therefore, the number of parts can be reduced by integrating plural means having different functions, whereby the parts cost and the man-hours required for assembly and adjustment are reduced, resulting in a reduction in the total cost.

According to a twenty-first aspect of the present invention, in the 3D-shape measurement apparatus according to the twentieth aspect, the converging distance changing means, which comprises parallel glasses having a light-incident surface and a light-emission surface parallel to the scanning line and changes the converging distance of the scanning light beam, is integrated with the prism constituting the reflected light path changing means. Therefore, the number of parts can be reduced by integrating plural means having different functions, whereby the parts cost and the man-hours required for assembly and adjustment are reduced, resulting in a reduction in the total cost.

According to a twenty-second aspect of the present invention, in the 3D-shape measurement apparatus according to the fifth aspect, the cylindrical lens constituting the reflected light path changing means is integrated with a reflected light emission point distance changing means which changes the distance up to an apparent emission point of the reflected light and is placed in an optical path along which the reflected light from the target object reaches the scanning convergence means. Therefore, the number of parts can be reduced, whereby the parts cost and the man-hours required for assembly and adjustment are reduced, resulting in a reduction in the total cost.

According to a twenty-third aspect of the present invention, in the 3D-shape measurement apparatus according to the twenty-second aspect, the cylindrical lens constituting the reflected light path changing means is integrated with a converging distance changing means which changes the converging distance of the scanning light beam and comprises parallel glasses having a light-incident surface and a light-emission surface parallel to the scanning line. Therefore, the number of parts can be reduced, whereby the parts cost and the man-hours required for assembly and adjustment are reduced, resulting in a reduction in the total cost.

DETAILED DESCRIPTION OF THE PREFERRED EMBODIMENTS

[Embodiment 1]

Hereinafter, a 3D-shape measurement apparatus defined in claims 1 to 5 of the present invention will be described as a first embodiment of the invention, with reference to FIGS. 1 through 4.

Figure 1:
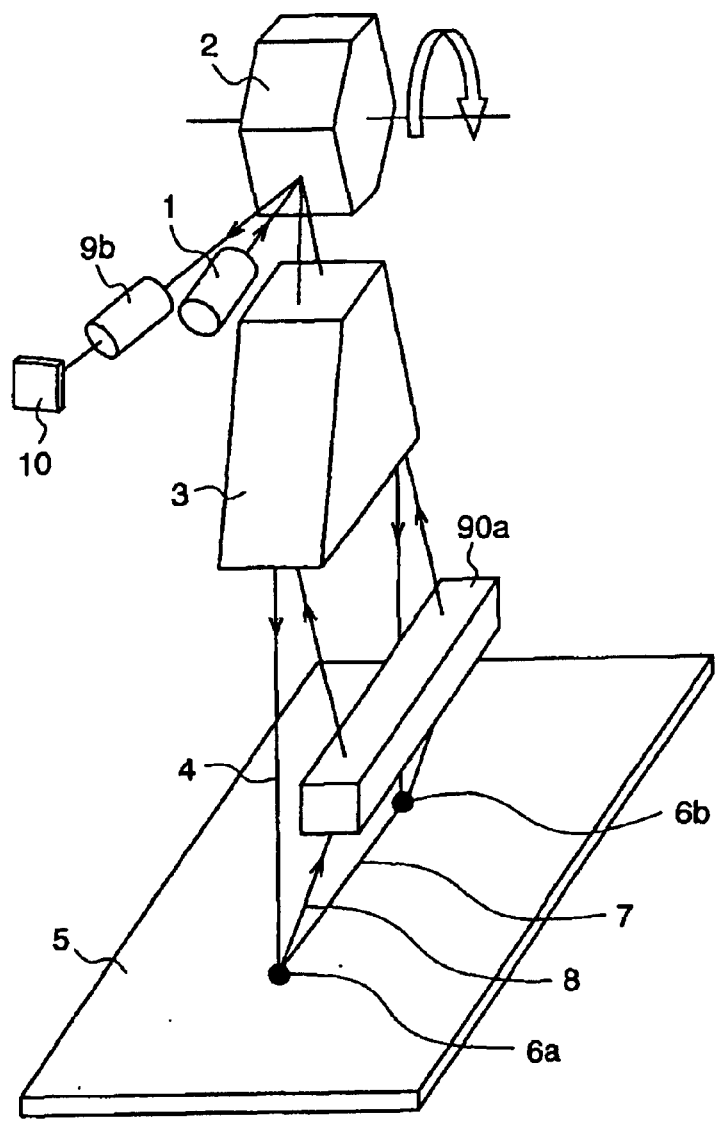
FIG. 1 is a perspective view illustrating the whole structure of a 3D-shape measurement apparatus according to the present invention.

FIG. 1 is a perspective view illustrating the whole structure of a 3D-shape measurement apparatus according to the present invention, which is a typical optical system.

With reference to FIG. 1, a light beam emitted from a light source 1 is polarized by a rotating mirror 2 such as a polygon mirror, and a scanning light beam 4 is converged by a convergence/scanning lens 3 such as a fθ lens to form a spot light 6*a* onto a target 5 to be measured. The spot light 6*a* scans the target 5 along a straight line (scanning line) 7 up to a spot 6*b*, with rotation of the rotating mirror 2. A reflected light 8, which travels in a direction different from the direction along which the scanning light 4 travels, passes through a photoreceptive optical system 90*a* and a scanning optical system composed of the convergence/scanning lens 3 and the rotating mirror 2, and forms an image on a position detector 10 such as a PSD or CCD camera, through a photoreceptive optical system 9*b*. Then, height data of a point irradiated with the spot light 6 is obtained by triangulation from position data of the image, which is obtained by converting the reflected light 8 into an electric signal.

The spot light 6 scans the target 5 along the scanning line 7, and the target 5 moves in synchronization with the rotation of the rotating mirror 2 in the direction (sub scanning direction 12) perpendicular to a plane which includes the direction of the scanning line 7 (main scanning direction 11) and the direction 40 along which the scanning light 4 travels, whereby the spot light 6 scans the target 5 two-dimensionally, and the 3D-shape of the target 5 is measured by storing and arranging the height data at the respective scanning positions on a memory.

As described above, in the structure of the typical optical system shown in FIG. 1, the photoreceptive optical system 90*a* performs the function of guiding the reflected light 8 from the target 5 to the scanning optical system.

Figure 2A:
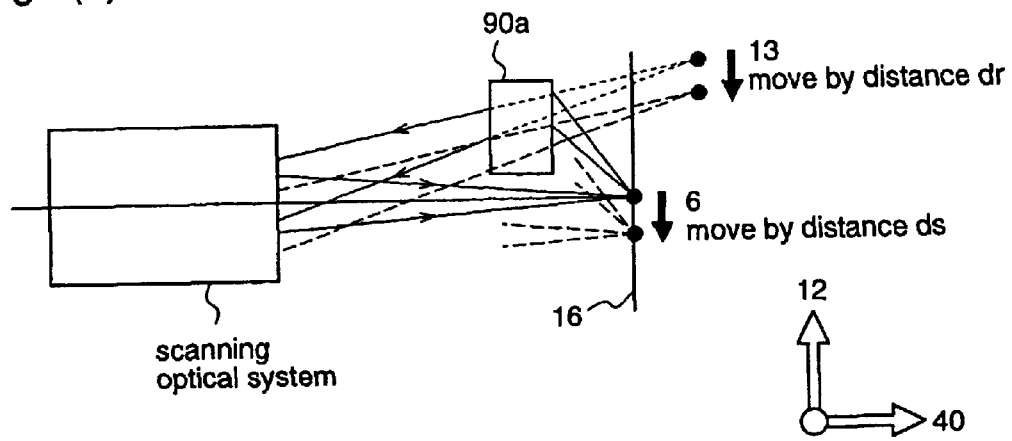
FIGS. 2(a) and 2(b) are diagrams for explaining the principle of a 3D-shape measurement apparatus according to a first embodiment of the invention, illustrating the case where a spot light moves (2(a)), and the case where the movement of the spot light is caused by deformation of a scanning optical system (2(b)).
Figure 2B:
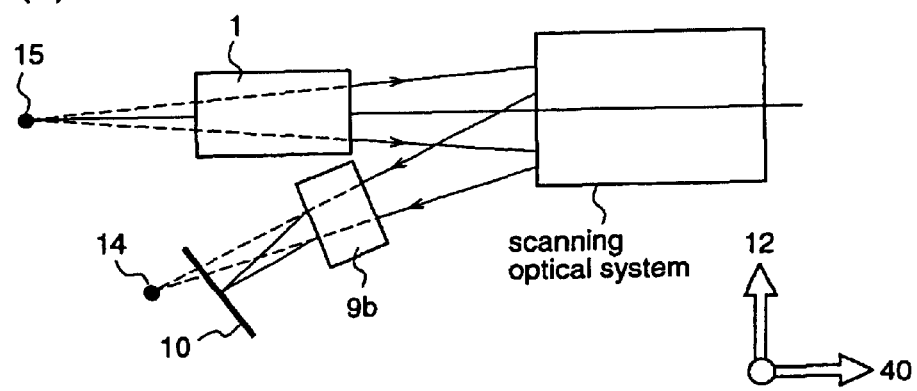

FIGS. 2(*a*) and 2(*b*) are diagrams for explaining the principle of a 3D-shape measurement apparatus according to the first embodiment.

As shown in FIG. 2(*a*), when the spot light 6 moves by a distance ds in the sub scanning direction 12, as for a movement component in the sub scanning direction 12 among movement components of the position of an apparent light-emission point 13 of the reflected light 8 incident on the scanning optical system, the apparent light-emission point 13 moves in the same direction as a movement ds of the spot light 6 by an approximately equal distance (dr).

In the case where the movement of the spot light 6 in the sub scanning direction 12 is caused by deformation of the scanning optical system, when ds is equal to dr, the relative distance between the spot light 6 and the apparent light-emission point 13, which distance is projected in the sub scanning direction 12, becomes constant, whereby the relative positions of an apparent light-emission point 15 of the light source 1 shown in FIG. 2(*b*) and the apparent focal point 14 of the reflected light after passing through the scanning optical system, which positions are projected in the sub scanning direction 12, also become constant. Accordingly, unless the apparent light-emission point 15 of the light source 1 moves, the apparent focal point 14, that is, the image position on the position detector 10 (i.e., the height data to be measured) becomes constant without being affected by variations in the position of the spot light 6. Assuming that a height error to be originally caused by the movement (distance ds) of the spot light is hs, even when ds is not equal to dr, an actual height error hr can be reduced as represented by the following formula (1), employing the moving distance dr of the apparent light-emission point 13.

$$hr/hs = dr/ds - 1 \qquad (1)$$

The condition for reducing the actual height error hr below the original height error hs, i.e., the condition for making the absolute value of hr/hs smaller than 1, is obtained by altering formula (1) as follows.

$$-1 < hr/hs = dr/ds - 1 < 1 \quad 0 < dr/ds < 2 \qquad (2)$$

When the distance dr is equal to the distance ds, hr is 0 as described above, and there occurs no error in the measured height. Further, when dr is not equal to ds, even if the spot light 6 moves due to deformation of the scanning optical system, an error in the measured height can be reduced so long as formula (2) is satisfied.

Next, a description will be given of a specific structure of a 3D-shape measurement apparatus defined in claims 2 and 3, for realizing the above-mentioned structure.

FIGS. 3(*a*) and 3(*b*) are diagrams for explaining the positional relationship between an object and an image by mirror reflection. FIG. 3(*a*) shows the positional relationship between an object and an image by reflection of a single mirror.

Figure 3A:
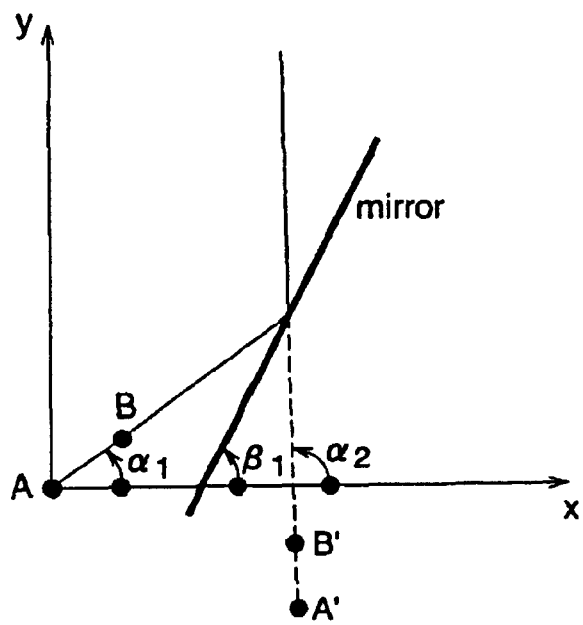
FIGS. 3(a) and 3(b) are diagrams for explaining the relationship between an object and an image movement by mirror reflection, illustrating the case where the apparatus is provided with a single mirror (3(a)), and the case where the apparatus is provided with plural mirrors (3(b)).

With reference to FIG. 3(a), when the object moves from point A to point B and the image moves from point A' to point B', assuming that an angle formed between the vector AB and the x axis is $\alpha_1$, an angle formed between the mirror surface and the x axis is $\beta_1$, and an angle formed between the vector A'B' and the x axis is $\alpha_2$ (in any case, the direction of rotation from the x axis to the y axis is positive), the following formula (3) holds from geometric conditions.

$$\alpha_2 = 2\beta_1 - \alpha_1 \qquad (3)$$

Figure 3B:
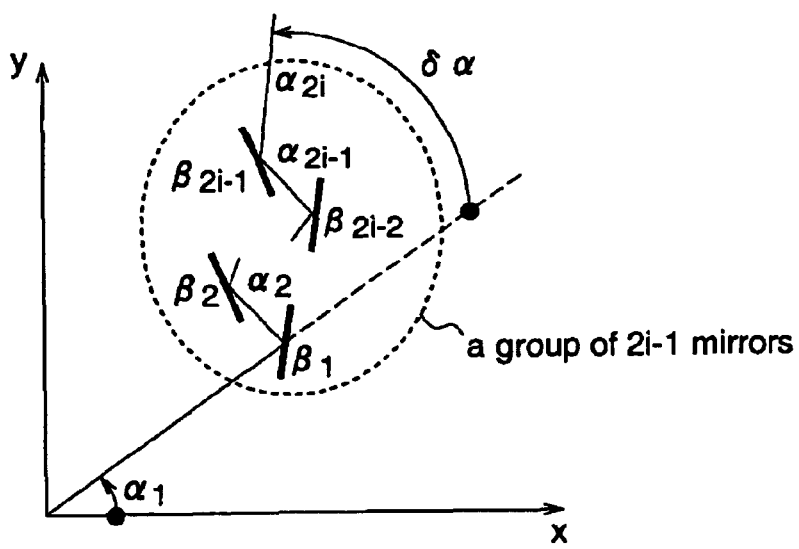

As shown in FIG. 3(b), when reflections occur at plural mirrors, formula (3) is altered as follows.

reflection at 2i-th mirror: $\alpha_{2i+1} = 2\beta_{2i} - \alpha_{2i}$
reflection at (2i−1)th mirror: $\alpha_{2i} = 2\beta_{2i-1} - \alpha_{2i-1}$
From a difference between these formulae:

$$\alpha_{2i+1} = 2(\beta_{2i} - \beta_{2i-1}) + \alpha_{2i}$$
$$= 2(\beta_{2i} - \beta_{2i-1}) + 2(\beta_{2i-2} - \beta_{2i-3}) + \alpha_{2i-3}$$
$$= 2\Sigma(\beta_{2j} - \beta_{2j-1}) + \alpha_1$$

($\Sigma$: sum of j=1~i, and so forth)

Accordingly, an angle $\alpha_{2i+1}$ of an image reflected at the 2i-th (even number) mirror is represented by the following formula (4).

$$\alpha_{2i+1} = 2\Sigma(\beta_{2j} - \beta_{2j-1}) + \alpha_1 \qquad (4)$$
$$= Be + \alpha_1 \quad (Be = 2\Sigma(\beta_{2j} - \beta_{2j-1}))$$

where Be is a fixed value depending on the angle $\beta_j$ of the mirror group.

Further, an angle $\alpha_{2i}$ of an image reflected at the (2i−1)th (odd number) mirror is represented by the following formula (5).

$$\alpha_{2i} = 2\beta_{2i-1} - 2\Sigma(\beta_{2j} - \beta_{2j-1}) - \alpha_1 \qquad (5)$$
$$= Bo - \alpha_1 \quad (Bo = 2\beta_{2i-1} - 2\Sigma(\beta_{2j} - \beta_{2j-1}))$$

where Bo is a fixed value depending on the angle $\beta_j$ of the mirror group.

Assuming that an incident angle into the whole of the plural mirrors is $\alpha_{in}$ and an outgoing angle from the mirrors is $\alpha_{out}$, the total turning angle $\delta\alpha$ is represented by the following formula (6) when the number of mirrors is 2i (even number), and it is the fixed value Be depending on the angle $\beta_j$ of the mirror group.

$$\delta\alpha = \alpha_{out} - \alpha_{in} = Be \qquad (6)$$

Further, when the number of mirrors is 2i−1 (odd number), the total turning angle $\delta\alpha$ is represented by the following formula (7).

$$\delta\alpha = \alpha_{out} - \alpha_{in} = Bo - 2\alpha_{in} \qquad (7)$$

Figure 4A:
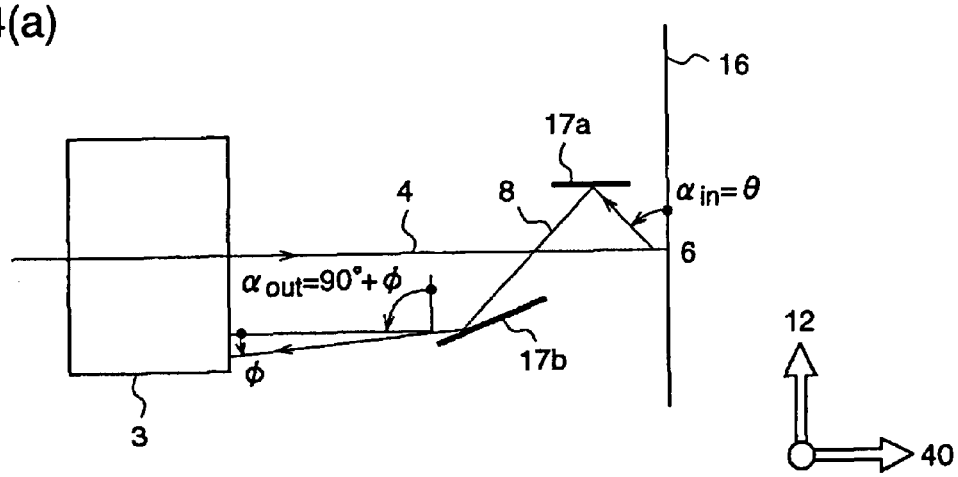
FIGS. 4(a) and 4(b) are diagrams for explaining a photoreceptive optical system of the 3D-shape measurement apparatus according to the first embodiment, illustrating the structure of the photoreceptive optical system comprising two mirrors (4(a)), and a movement of a spot light (4(b)).
Figure 4B:
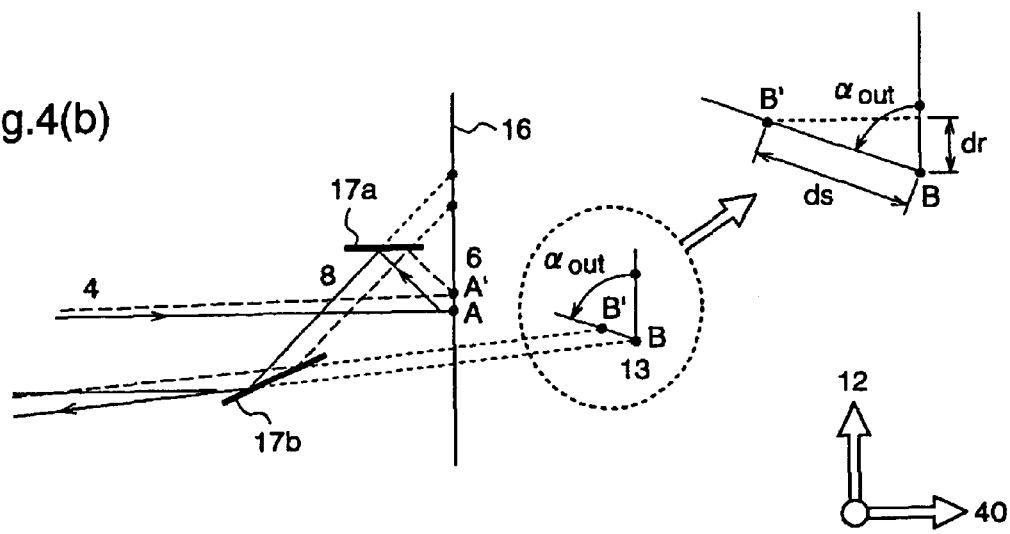

FIGS. 4(a) and 4(b) are diagrams for explaining the photoreceptive optical system of the 3D-shape measurement apparatus according to the first embodiment.

When the above-described model is applied with the traveling angle of the reflected light 8 to be measured, the photoreceptive optical system 90a shown in FIG. 1 is constituted by two mirrors 17a and 17b as shown in FIG. 4(a). The x axis corresponds to the sub scanning direction 12, the y axis corresponds to the direction opposite to the scanning light optical axis direction 40, $\alpha_{in}$ corresponds to an angle $\theta$ which is obtained by projecting an angle formed between the direct reflected light 8 from the spot light 6 and the scanning plane 6, onto the plane perpendicular to the main scanning direction 11, and $\alpha_{out}$ corresponds to an angle obtained by projecting an angle formed between the reflected light 8 emitted from the photoreceptive optical system 90a and the scanning plane 6, onto the plane perpendicular to the main scanning direction 11.

Since, with respect to $\alpha_{out}$, the degree of freedom in arranging the photoreceptive optical system 9b is increased as the incident reflected light is closer to parallel with the optical axis of the scanning/convergence lens 3, the range of $\alpha_{out}$ is 90°−ϕ~90°+ϕ. The angle ϕ is desired to be not so large. Accordingly, the following formulae (8) and (9) are obtained from formulae (4) and (5) for the number of mirrors being even and odd, respectively.

even number: 90°−θ−ϕ<Be<90°−θ−ϕ  (8)

odd number: 90°+θ−ϕ<Bo<90°+θ+ϕ  (9)

On the other hand, in the case where the spot light 6 moves from point A to point A' by a distance ds along the sub scanning direction 12 due to deformation of the scanning optical system as shown in FIG. 4(b), when the above-described model is applied with respect to the movement of the spot light 6, the x axis corresponds to the sub scanning direction 12, the y axis corresponds to the direction opposite to the scanning light optical axis direction 40, $\alpha_{in}$ corresponds to an angle formed between the x axis and a line AA', which angle is always 0, and $\alpha_{out}$ corresponds to an angle formed between the x axis and a line BB' which includes points B and B' before and after a movement of the apparent light-emission point 13 emitted from the photoreceptive optical system 90a. In this case, assuming that a moving distance from point B to point B' in the sub scanning direction 12 is dr, the following formula holds as $\alpha_{in}$=0.

$$dr/ds = \cos(\alpha_{out}) = \cos(\delta\alpha)$$

Therefore, in order to reduce an error in the measured height due to deformation of the scanning optical system, the range of the reflected light turning angle $\delta\alpha$ of the photoreceptive optical system 90a becomes −90°~90° from formula (2).

Accordingly, the following formulae (10) and (11) are obtained from formulae (6) and (7) for the number of mirrors being even and odd, respectively.

even number: −90°<δα=Be<90°  (10)

odd number: −90°<δα=Bo<90°  (11)

When the photoreceptive optical system 90a is constituted by even number of mirrors, the conditions for satisfying formulae (8) and (10) at the same time are represented by the following formula (12) by comparing the both sides of the formulae.

−90°<90°−θ+ϕ and 90°−θ+ϕ<90°ϕ<180°−θ and ϕ<θ  (12)

It is evident that ϕ which satisfies formula (12) when the range of θ is 0~90° can be easily selected.

On the other hand, when the photoreceptive optical system 90a is constituted by odd number of mirrors, the conditions for satisfying formulae (9) and (11) at the same time are represented by the following formula (13) by comparing the both sides of the formulae.

$$-90°<90°+\theta-\phi \text{ and } 90°+\theta+\phi<90° \phi<180°+\theta \text{ and } \phi<-\theta \quad (13)$$

When $\phi$ which satisfies the condition $\phi<-\theta$ shown in formula (13) when the range of $\theta$ is 0~90° is taken, if $\theta$ is large, the incident angle onto the scanning convergence lens is increased, resulting in problems in the photoreceptive performance (aberration, aperture, etc.). Therefore, a special scanning convergence means is required or the range of $\theta$ must be limited, resulting in a difficulty in realization.

When the photoreceptive optical system 90a is constituted by even number of mirrors, the turning angle of the reflected light becomes the fixed value Be as shown in formula (4). In formula (4), Be is the sum of differences $(\beta_{2j}-\beta_{2j-1})$ in angles $\beta$ between the adjacent 2j-th and (2j-1)th mirrors. That is, when the relative angle between the mirrors is constant, the fixed value Be, i.e., the turning angle of the reflected light, does not change even when the whole angle changes.

On the other hand, when the photoreceptive optical system 90a is constituted by odd number of mirrors, the tuning angle of the reflected light becomes the fixed value Bo as shown in formula (5). In this case, since there are the angle $\beta_{2i-1}$ of the final (2i−1)th mirror and the incident angle $\alpha_{in}$, aside from the sum of differences $(\beta 2j-\beta_{2j-1})$ in angles between the adjacent mirrors, the turning angle of the reflected light changes when the whole angle changes even though the relative angle between the mirrors is constant.

As described above, when the photoreceptive optical system 90a is constituted by even number (at least two) of mirrors which are parallel with the scanning line 7, an error in measured height which is caused by a movement of the spot light 6 due to deformation of the scanning optical system can be reduced. Furthermore, when the relative position between the mirrors is maintained, the height error can be reduced even when the photoreceptive optical system rotates about the main scanning direction 11.

[Embodiment 2]

Next, a 3D-shape measurement apparatus according to a second embodiment of the present invention will be described.

Figure 5A:
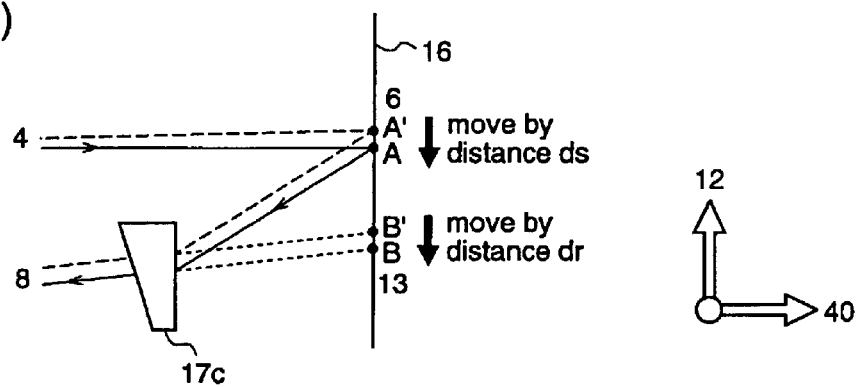
FIGS. 5(a)–5(c) are diagrams for explaining the structure of a 3D-shape measurement apparatus according to a second embodiment of the present invention, illustrating the case where the photoreceptive optical system is constituted by a prism (5(a)), a cylindrical lens (5(b)), or a Fresnel prism (5(c)).
Figure 5B:
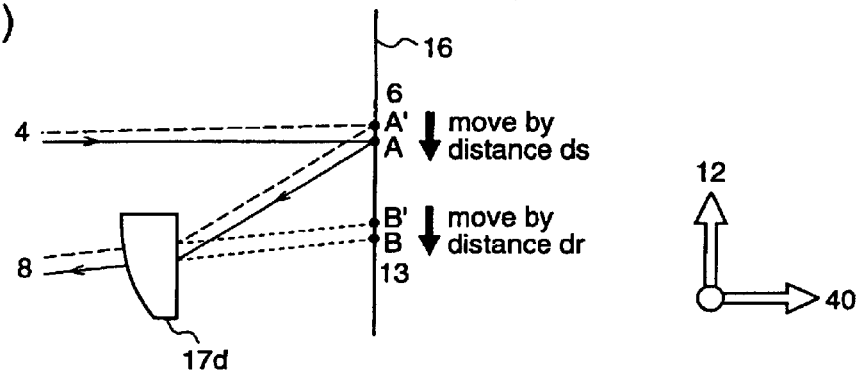
Figure 5C:
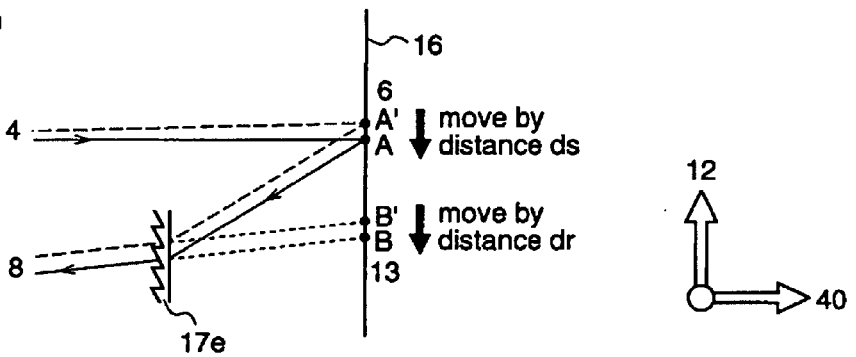

FIGS. 5(a)–5(c) are diagrams for explaining the structure of a photoreceptive optical system of the 3D-shape measurement apparatus according to the second embodiment. FIG. 5(a) shows the case where the photoreceptive optical system 90a shown in FIG. 1 is constituted by a prism 17c having a light-incident surface and a light-emission surface which are parallel to the main scanning direction 11.

With reference to FIG. 5(a), the prism 17c has a function of refracting the reflected light 8 which is emitted from point A of the spot light 6, within a plane perpendicular to the main scanning direction 11, whereby the reflected light 8 is guided to the scanning convergence lens 3. Assuming that the apparent emission point 13 of the reflected light 8 from the prism 17c is point B, when the position of the spot light 6 moves from point A to point A' by a distance ds along the sub scanning direction 12, the apparent light-emission point 13 moves from point B to point B' by a distance dr in the sub scanning direction 12. In this case, in view of prism characteristics, the orientation of the movement of the light-emission point B in the sub scanning direction 12 becomes the same as the orientation of the movement of the point A, and the relationship between the distance ds of the movement of the spot light 6 in the sub scanning direction and the distance dr of the movement of the apparent light-emission point 13 in the sub scanning direction 12 can satisfy the above-mentioned formula (2) by appropriately selecting the angles of the light-incident surface and light-emission surface of the prism, the refractive index of the prism, and the like.

As described above, when the photoreceptive optical system 90a is constituted by the prism 17c having the function of refracting the reflected light 8 within the plane perpendicular to the main scanning direction 11, an error in measured height, which is caused by a movement of the spotlight 6 due to deformation of the scanning optical system, can be reduced.

Furthermore, in view of prism characteristics, the positional deviation of the apparent light-emission point 13 can be suppressed even when the prism 17c rotates about the main scanning direction 11, whereby an error in measured height can be reduced.

FIG. 5(b) illustrates the fundamental structure of a 3D-shape measurement apparatus defined in claim 5, wherein the photoreceptive optical system 90a is constituted by a cylindrical lens 17d instead of the prism 17c shown in FIG. 5(a).

With reference to FIG. 5(b), as described for the case of employing the prism 17c, the orientation of the movement of the light-emission point B in the sub scanning direction 12 is the same as the orientation of the movement of the point A, and the relationship between the moving distance ds of the spot light 6 in the sub scanning direction 12 and the moving distance dr of the apparent light-emission point 13 in the sub scanning direction 12 can satisfy formula (2).

Furthermore, FIG. 5(c) shows the fundamental structure of a 3D-shape measurement apparatus defined in claim 6, wherein the photoreceptive optical system 90a is constituted by a prism sheet 17e.

With reference to FIG. 5(c), as described for the case of employing the prism 17c, the orientation of the movement of the light-emission point B in the sub scanning direction 12 is the same as the orientation of the movement of the point A, and the relationship between the moving distance ds of the spot light 6 in the sub scanning direction 12 and the moving distance dr of the apparent light-emission point 13 in the sub scanning direction 12 can satisfy formula (2). Furthermore, since the prism sheet 17e can be formed in a sheet shape as shown in FIG. 5(c), its spatial volume is small. Therefore, the prism sheet 17e hardly affects the placements of other optical members, whereby the degree of freedom in optical design is increased, and additional functions and improved performance are easily realized.

While the prism sheet 17e having a sawtooth-shaped cross-section is shown in FIG. 5(c), a diffraction grating having multiple pits and projections may be employed with the same effects as mentioned above.

[Embodiment 3]

Hereinafter, a 3D-shape measurement apparatus according to a third embodiment of the present invention will be described.

Figure 6A:
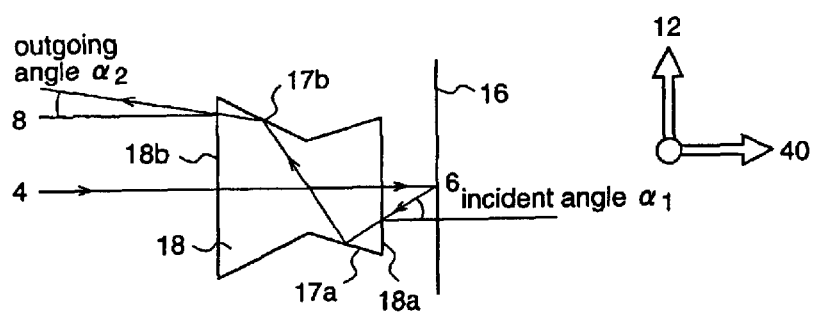
FIGS. 6(a)–6(c) are diagrams for explaining the fundamental structure of a 3D-shape measurement apparatus according to a third embodiment of the invention, illustrating the structure of an integrated photoreceptive optical system (6(a)), the placement of a correction prism (6(b)), and the occurrence of a difference in optical path lengths (6(c)).
Figure 6B:
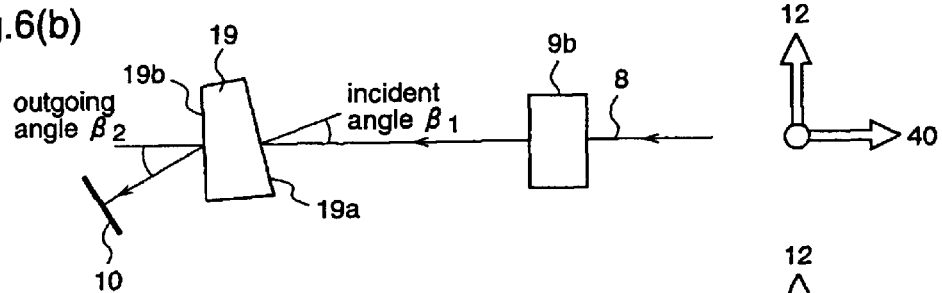
Figure 6C:
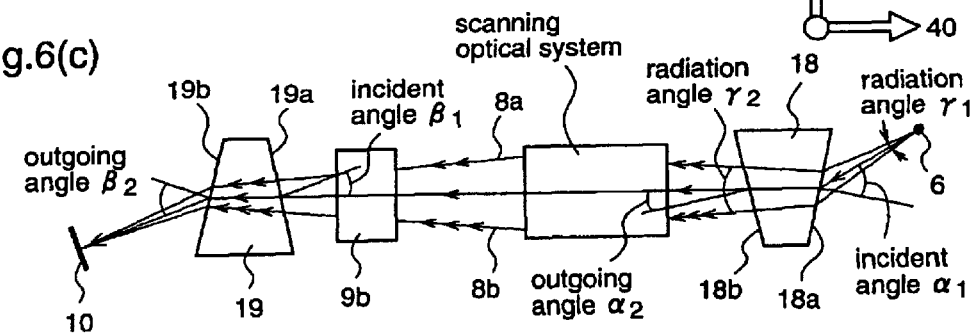

FIGS. 6(a)–6(c) are diagrams for explaining the fundamental structure of a 3D-shape measurement apparatus according to the third embodiment. FIG. 6(a) shows the main structure of a 3D-shape measurement apparatus defined in claim 7.

With reference to FIG. 6(a), an integrated photoreceptive optical system (prism) 18 is provided with, at its inner planes, two mirrors of a photoreceptive optical system having the structure defined in claim 3 (corresponding to FIG. 3(b)), and the reflected light 8 from the spot light 6 is guided, through the two mirrors 17a and 17b disposed at the inner planes of the prism 18, to the scanning convergence lens 3.

Further, as shown in FIG. 6(b), a correction prism 19 is disposed between the position detector 10 and the photoreceptive optical system 9b. In this case, assuming that the light on one side of the reflected light 8 is 8a while the light on the opposite side is 8b as shown in FIG. 6(c), a difference in optical path lengths occurs between the reflected light 8a and the reflected light 8b because the reflected light 8 is refracted in the prism 18. Therefore, even when the reflected light 8 is converged through the scanning optical system and the photoreceptive optical system 9b, the reflected light is not focused to a point on the position detector 10. So, a difference in optical path lengths in the opposite direction to the difference in optical path lengths generated by the prism 18 is generated between the reflected light 8a and the reflected light 8b using the correction prism 19 to cancel the difference in optical path lengths generated by the prism 18, whereby the reflected light 8 is focused to a point on the position detector 10.

To be specific, assuming that the incident angle to the light-incident surface of the prism 18 is $\alpha_1$, the outgoing angle from the light-emission surface 18b of the prism 18 is $\alpha_2$, the incident angle to the light-incident surface 19a of the correction prism 19 is $\beta_1$, and the outgoing angle from the light-emission surface 19b of the correction prism 19 is $\beta_2$, when the prism 18 and the correction prism 19 have the same refractive index and the optical magnification between the spot light 6 and the image on the position detector 10 is 1, if $\alpha_1=\beta_2$ and $\alpha_2=\beta_1$, the difference in optical path lengths generated by the prism 18 is canceled by the difference in optical path lengths generated by the correction prism 19, whereby the light beams 8a and 8b at both ends of the reflected light 8 have the same optical path length, and the size of the image on the position detector 10 is reduced, resulting in improved accuracy of measured height.

Since the shape of the prism 18 is restricted by its cost or size, an optimum combination of angles $\alpha_1$ and $\alpha_2$, by which the aberration is minimized, cannot be realized in many cases. However, when the correction prism 19 satisfying the above-mentioned condition is employed, the aberration generated in the prism 18 can be reduced. Further, since the position of the reflected light 8 is approximately constant at the position of the correction prism 19 regardless of the scanning position, the size of the correction prism 19 can be reduced, resulting in reduced cost.

Even when the prism 18 and the correction prism 19 have different refractive indexes or the optical magnification is not 1, the aberration can be reduced by selecting an incident angle $\beta_1$ and an outgoing angle $\beta_2$ of the correction prism 19, which are appropriate for correcting (canceling) the difference in optical path lengths, with respect to the incident angle $\alpha_1$ and the outgoing angle $\alpha_2$ of the prism 18, whereby the size of the image on the position detector 10 can be optimized.

Further, when the reflected light 8 travels through the prism 18, the radiation angle of the reflected light changes, whereby astigmatic aberration occurs. That is, as shown in FIG. 6(c), the radiation angle $\gamma_1$ of the reflected light 8 before being inputted to the prism 18, which is projected on the plane perpendicular to the main scanning direction 11, is different from the radiation angle $\gamma_2$ of the reflected light 8 after being emitted from the prism 18, because of the function of the prism 18. On the other hand, the radiation angle of the reflected light 8 which is projected on the plane perpendicular to the sub scanning direction 12 is the same before incidence on the prism 8 and after emission from the prism 8, because the prism 18 merely functions as parallel glasses. Therefore, an astigmatic aberration occurs, and the converged light 8 does not form a point image but forms a linear image. This astigmatic aberration does not adversely affect the accuracy of measured height so long as the longitudinal direction of the linear image intersects at a right angle with the direction of position detection by the position detector 10. However, since such intersection at a right angle is usually impossible because of the problem about the parts accuracy or assembly accuracy, the astigmatic aberration causes a reduction in the accuracy of measured height. The correction prism 19 described above can correct the astigmatic aberration, whereby the image formation state is improved.

Furthermore, also in the case where the photoreceptive optical system 90a is constituted by a prism sheet, when the correction prism 19 shown in FIG. 6(b), which reduces the aberration that occurs in the photoreceptive optical system 90a, is provided between the position detector 10 and the photoreceptive optical system 9b, the image size of the reflected light 8 on the position detector 10 is reduced, whereby an error in measured height can be reduced.

Furthermore, in the structure of a 3D-shape measurement apparatus defined in claim 9, the photoreceptive optical system 90a is constituted by a cylindrical lens. In this case, the reflected light 8 is refracted in the plane perpendicular to the main scanning direction 11 and is guided to the scanning optical system and, simultaneously, the radiation angle of the reflected light 8 which is projected on the plane perpendicular to the main scanning direction 11 changes because of the effect of the optical system 90a as a lens, whereby an astigmatic aberration occurs in the reflected light 8. Therefore, an additional cylindrical lens is disposed between the position detector 10 and the photoreceptive optical system 9b so as to have a power in the direction perpendicular to the cylindrical lens constituting the photoreceptive optical system 90a, whereby the image size of the reflected light 8 on the position detector 10 is reduced, and the error in measured height can be reduced.

[Embodiment 4]

Hereinafter, a 3D-shape measurement apparatus according to a fourth embodiment of the present invention will be described.

In this fourth embodiment, 3D-shape measurement apparatuses defined in claims 10 to 17 will be described with reference to FIGS. 7 through 10.

Figure 7:
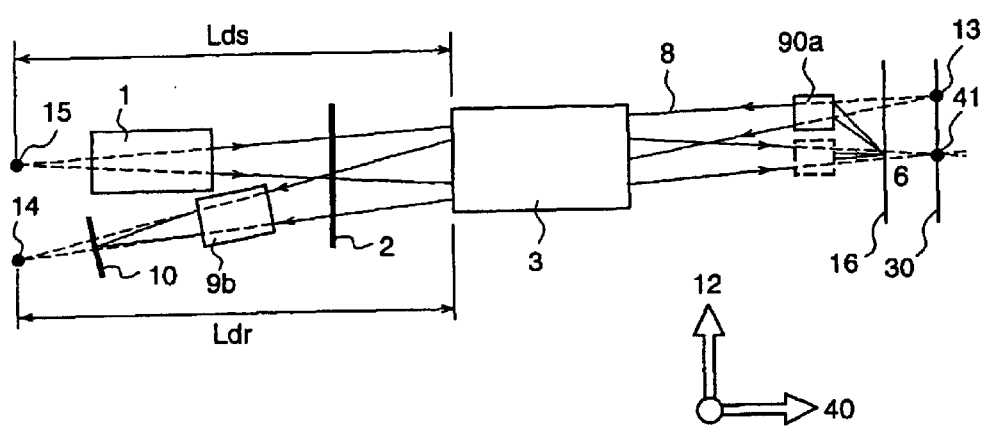
FIG. 7 is a diagram for explaining the fundamental structure of a 3D-shape measurement apparatus according to a fourth embodiment of the present invention.

FIG. 7 is a diagram illustrating the fundamental construction of a 3D-shape measurement apparatus defined in claim 10.

In FIG. 7, when the apparent emission point 13 of the reflected light 8 to be incident on the scanning convergence lens 3 passes through the apparent focal point 41 of the scanning light 4 which has passed through the scanning convergence lens 3, and is positioned on the plane perpendicular to the scanning light 4 (apparent scanning plane 30), a distance Ldr up to the apparent focal point 14 of the reflected light 8 which is emitted from the scanning optical system is always equal to a distance Lds up to the apparent emission point 15 of the light beam which is emitted from the light source 1 to be incident on the scanning convergence lens 3, regardless of the scanning position.

Since the light source 1 is fixed, the distance Lds is constant, and the distance Ldr of the reflected light 8 is always constant regardless of the scanning position. Further, since the photoreceptive optical system 9b disposed between the position detector 10 and the scanning convergence lens 3 is also fixed, the reflected light 8 converged by the photoreceptive optical system 9b is always focused on the position detector 10, and the image size is constant.

Although the height measurement accuracy is reduced as the image size on the position detector 10 becomes larger, since the image size on the position detector 10 is constant in this case, the height measurement accuracy is constant regardless of the scanning position. That is, since the apparent emission point 13 of the reflected light 8 to be incident on the scanning convergence lens 3 is positioned on the apparent scanning plane 30 regardless of the scanning position, stable height measurement can be always carried out regardless of the scanning position, and further, the total height measurement accuracy over the whole scanning range can be improved.

When there is no optical system for changing the convergence distance of the scanning light 4 between the scanning convergence lens 3 and the actual scanning plane 16, the apparent scanning plane 30 matches the actual scanning plane 16.

Figure 8A:
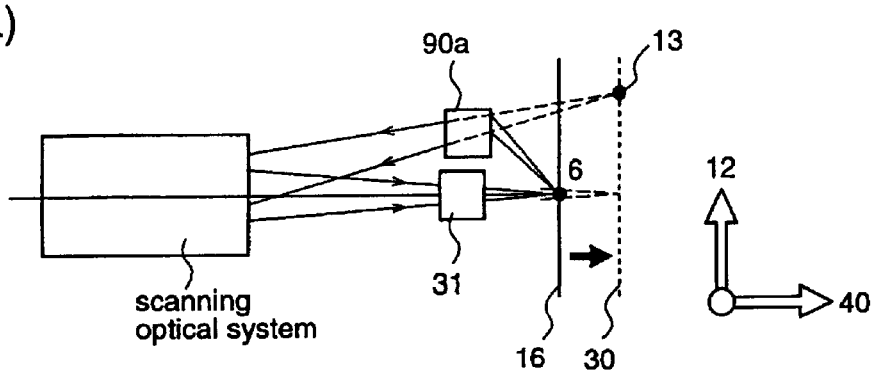
FIGS. 8(a) and 8(b) are diagrams for explaining the structure of a scanning light expansion/contraction means of a 3D-shape measurement apparatus according to a fourth embodiment of the invention, illustrating the case where an apparent light-emission point is positioned in the scanning light traveling direction with respect to a scanning plane (8(a)), and the case where an apparent light-emission point is positioned in the direction opposite to the scanning light traveling direction.
Figure 8B:
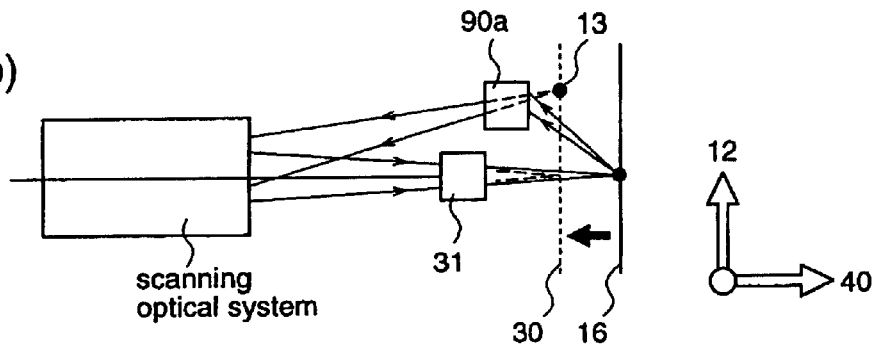

FIGS. 8(*a*) and 8(*b*) are diagrams illustrating the fundamental structure of a 3D-shape measurement apparatus defined in claim 11, for explaining a scanning light expansion/contraction means of the 3D-shape measurement apparatus.

With reference to FIG. 8, a means 31 having a function of changing the distance of the converged light to the focal point is inserted between the scanning convergence lens 3 and the scanning plane 16, and the position of the apparent scanning plane 30, which is viewed from the scanning convergence lens 3 toward the scanning plane 16, is moved until it matches the position of the apparent light-emission point 13, thereby realizing the 3D-shape measurement apparatus defined in claim 10.

In FIG. 8(*a*), when the position of the apparent light-emission point is in the scanning light traveling direction 40 with respect to the scanning plane 16, the means 31 having a function of shortening the distance up to the focal point of the converged light (convergence distance changing means) is inserted, and the apparent scanning plane 30 is moved in the scanning light traveling direction 40 with respect to the scanning plane 16, thereby realizing the structure of claim 11.

Further, in FIG. 8(*b*), when the position of the apparent light-emission point 13 is in the direction opposite to the scanning light traveling direction 40 with respect to the scanning plane 16, the means 31 having a function of lengthening the distance up to the focal point of the converged light is inserted, and the apparent scanning plane 30 is moved in the direction opposite to the scanning light traveling direction 40 with respect to the scanning plane 16, thereby realizing the structure of claim 11.

Figure 9A:
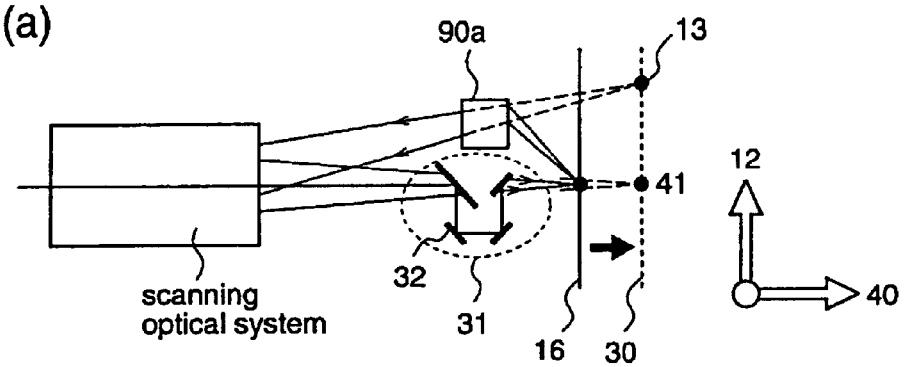
FIGS. 9(a) and 9(b) are diagram for explaining the structure of the scanning light expansion/contraction means of the 3D-shape measurement apparatus according to the fourth embodiment, illustrating the case where the scanning light expansion/contraction means is constituted by a group of mirrors (9(a)), or parallel glasses (9(b)).

FIGS. 9(*a*) and 9(*b*) are diagrams illustrating the fundamental structure of a 3D-shape measurement apparatus defined in claims 12 and 13, for explaining a scanning light expansion/contraction means of the 3D-shape measurement apparatuses.

FIG. 9(*a*) shows the case where the means 31 having a function of shortening the distance up to the focal point of the converged light is constituted by a group of four mirrors 32 which are parallel to the axis of the main scanning direction 11.

In FIG. 9(*a*), when the scanning light 4 travels through the four mirrors while being refracted by the mirrors, the optical distance (optical path length) has passed through, and the position of the actual focal point moves in the direction opposite to the light traveling direction 40, with respect to the apparent focal point 41 of the scanning light 4 viewed from the scanning convergence lens 3. That is, the apparent scanning plane 30 moves in the light traveling direction with respect to the actual scanning plane 16.

The intervals and angles of the mirrors are appropriately selected so that the apparent light-emission point 13 is positioned on the apparent scanning plane 30. Actually, the same effect as described above can be achieved when at least three mirrors are provided.

Further, when the mirror group 32 comprises an even number of mirrors and the relationships among the mirrors are fixed, even when the whole mirror group 32 is rotated about the main scanning direction 11, the angle of the outgoing scanning light 4 is not changed as described for the 3D-shape measurement apparatus of claim 3, whereby highly reliable measurement is possible.

Further, FIG. 9(*b*) shows the case where the means 31 having a function of lengthening the distance up to the focal point of the converged light is constituted by a parallel glass 33 which is parallel to the axis of the main scanning direction 11.

In FIG. 9(*b*), when the scanning light travels through the glass 33 having a refractive index n and a thickness t, the focal point of the scanning light 4 moves in the light traveling direction 40 by a distance L which is represented by formula (30).

$$L=t(1-1/n) \qquad (30)$$

That is, the apparent scanning plane 30 moves in the direction opposite to the light traveling direction 40 with respect to the actual scanning plane 16. So, the refractive index n and the thickness t are appropriately selected so that the apparent light-emission point 13 is positioned on the apparent scanning plane 30.

FIGS. 10(*a*) and 10(*b*) are diagrams illustrating the fundamental structure of a 3D-shape measurement apparatus defined in claim 14, for explaining the structure of a reflected light expansion/contraction means of the 3D-shape measurement apparatus.

In FIGS. 10(*a*) and 10(*b*), a means 34 having a function of changing the distance up to the focal point of the converged light (reflected light emission point distance changing means) is inserted between the photoreceptive optical system 90*a* and the scanning convergence lens 3, whereby the apparent emission point 13 of the reflected light 8 to be incident on the scanning optical system is moved to a position on the scanning plane 16.

With reference to FIG. 10(*a*), when the position of the apparent light-emission point 13 is in the direction opposite to the scanning light traveling direction 40 with respect to the scanning plane 16, the means 34 having a function of lengthening the distance up to the apparent focal point of the converged light is inserted, and the apparent light-emission point 13 is moved in the scanning light traveling direction 40, thereby realizing the structure defined in claim 13. The means 34 for lengthening the distance up to the apparent focal point of the converged light may be constituted by a set of plural mirrors parallel to the main scanning direction 40, which is employed as the means 31 for changing the convergence distance of the spot light in FIG. 9(*a*), whereby a 3D-shape measurement apparatus defined in claim 15 is realized.

With reference to FIG. 10(*b*), when the position of the apparent light-emission point 13 is in the scanning light traveling direction 40 with respect to the scanning plane 16, the means 34 having a function of shortening the distance up to the apparent focal point of the converged light is inserted, and the apparent light-emission point 13 is moved in the direction opposite to the scanning light traveling direction 40, thereby realizing the structure defined in claim 13.

Figure 9B:
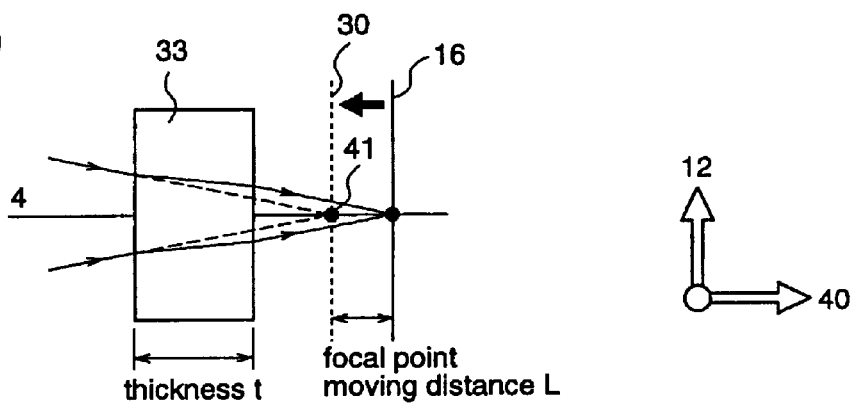

The means 34 for shortening the distance up to the apparent focal point of the converged light may be constituted by a parallel glass that is parallel to the main scanning direction 40, which is employed in FIG. 9(b) as the means 31 for changing the convergence distance of the spot light, whereby a 3D-shape measurement apparatus defined in claim 16 is realized.

Figure 10A:
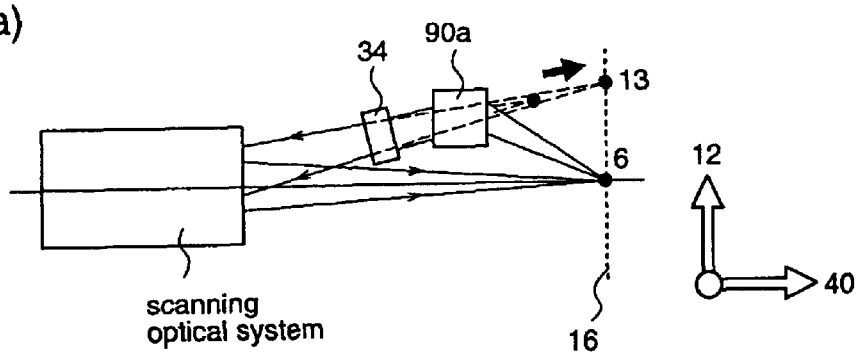
FIGS. 10(a) and 10(b) are diagrams for explaining the structure of a reflected light expansion/contraction means of the 3D-shape measurement apparatus according to the fourth embodiment, illustrating the case where an apparent light-emission point is positioned in the direction opposite to the scanning light traveling direction with respect to the scanning plane (10(a)), and the case where an apparent light-emission point is positioned in the scanning light traveling direction (10(b)).
Figure 10B:
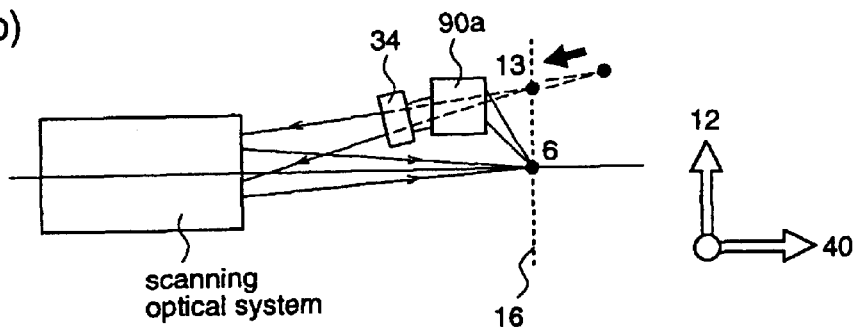

Further, in FIGS. 10(a) and 10(b), when the means 34 for changing the distance up to the apparent light-emission point is constituted by a cylindrical lens which extends in the main scanning direction 11, a 3D-shape measurement apparatus defined in claim 17 is realized. In this case, since an astigmatic aberration occurs in the reflected light 8 incident on the scanning optical means, the image of the reflected light on the position detector 10 is linear. If the longitudinal direction of the image is perpendicular to the direction along which the position detector detects the apparent light-emission point 13, the astigmatic aberration does not adversely affect the accuracy of measured height. However, if it deviates from a right angle even a small amount, the accuracy of measured height is reduced. In this case, a cylindrical lens for correction, which is identical to that employed in the 3D-shape measurement apparatus of claim 9, may be inserted before and after the photoreceptive optical system 9b to minimize the astigmatic aberration, thereby avoiding a reduction in the accuracy of measured height.

[Embodiment 5]

Next, a 3D-shape measurement apparatus according to a fifth embodiment of the present invention will be described.

Specifically, 3D-shape measurement apparatuses defined in claims 18 to 23 will be described with reference to FIGS. 11 to 13.

Figure 11A:
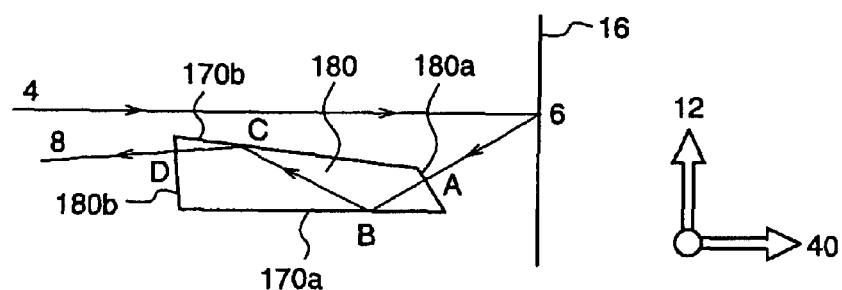
FIGS. 11(a) and 11(b) are diagrams for explaining the fundamental structure of a 3D-shape measurement apparatus according to a fifth embodiment of the invention, illustrating the case where a photoreceptive optical system is constituted by a prism having two mirrors at its inner surfaces (11(a)), and the case where the scanning light travels through two parallel transparent surfaces of a prism (FIG. 11(b)).
Figure 11B:
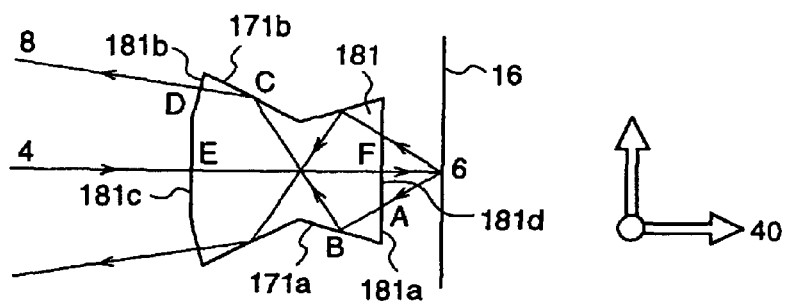

FIGS. 11(a) and 11(b) are diagrams for explaining the fundamental structure of a 3D-shape measurement apparatus according to the fifth embodiment of the invention. FIG. 11(a) shows the fundamental structure of a 3D-shape measurement apparatus defined in claim 18.

With reference to FIG. 11(a), the photoreceptive optical system 90a shown in FIG. 1 is constituted by a prism 180 having two mirrors 170a and 170b at its inner surfaces, and the reflected light 8 of the spot light 6 enters into the prism 180 through point A on the transparent plane 180a of the prism 180, is reflected twice at point B on the mirror 170a and point C on the mirror 170b, and emitted from point D of the transparent plane 180b to be guided to the scanning convergence lens 3.

Since the reflected light 8 is refracted at the mirrors 170a and 170b while traveling through the prism 180, the apparent light-emission point of the outgoing light from the mirror 170b, which is viewed from the scanning convergence lens 3, moves in the scanning light traveling direction 40. Simultaneously, since the reflected light travels through the prism 180 having a refractive index n, when it is assumed that the traveling distance of the reflected light in the prism 180 is t (=distance AB+distance BC+distance CD) and the refractive index of the prism 180 is n, the apparent light-emission point moves in the direction opposite to the scanning light traveling direction 40, as represented by formula (30).

Since these two movements of the apparent light-emission point are in the opposite directions, the directions of the movements can be canceled each other by appropriately selecting the interval of the mirrors 170a and 170b and the size of the prism 180. Therefore, it is possible to realize, with the single prism 18, an optical system which can achieve the following effects at the same time: the effect that the apparent light-emission point is positioned on the scanning plane 16, and the effect that the positional change of the light-emission point due to the positional change of the spot light 6 in the sub scanning direction can be made approximately constant.

Furthermore, FIG. 11(b) shows the fundamental structure of a 3D-shape measurement apparatus defined in claim 19.

In FIG. 11(b), the scanning light 4 passes through parallel transparent surfaces 181c and 181d of the prism 181 at points E and F, respectively. Assuming that the distance between the points E and F is t and the refractive index of the prism 181 is n, a movement of the apparent scanning plane 30, which is the effect obtained by the two parallel glasses, occurs according to the above-mentioned formula (30), whereby the apparent scanning plane 30 by the scanning light can be changed and, further, the positional change of the light-emission point 13 with the positional change of the spot light 6 in the sub-scanning direction can be made approximately constant, resulting in a high degree of freedom in design.

The 3D-shape measurement apparatuses defined in claims 18 and 19 may be provided with a correction prism for reducing an aberration which occurs when the light-incident surfaces or light-outgoing surfaces of the prisms 180 and 181 are not perpendicular to the reflected light 8, as described for the 3D-shape measurement apparatus defined in claim 7.

Figure 12A:
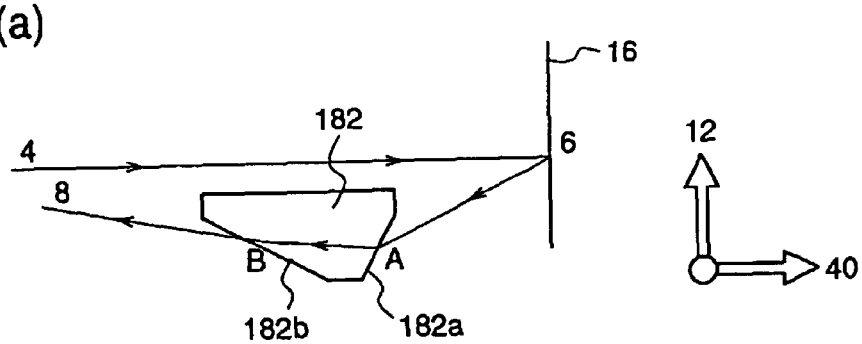
FIGS. 12(a) and 12(b) are diagrams for explaining the structure of the 3D-shape measurement apparatus according to the fifth embodiment, illustrating the case where the photoreceptive optical system is constituted by a prism having a light-incident surface and a light-emission surface which are parallel to the main scanning direction (12(*a*)), and the case where the scanning light is parallel to the main scanning direction and travels through two parallel transparent surfaces of a prism (12(*b*)).
Figure 12B:
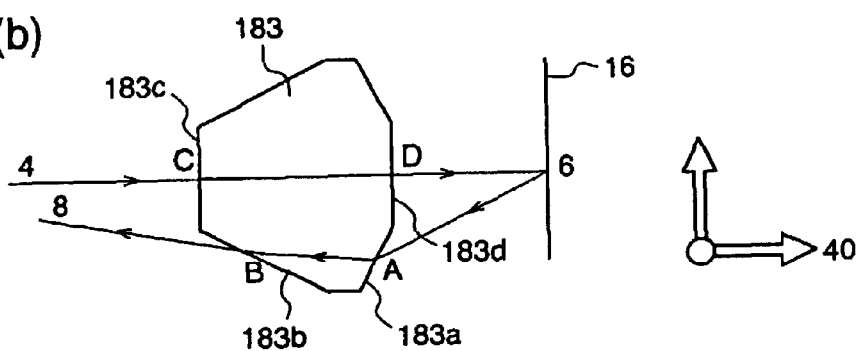

FIGS. 12(a) and 12(b) are diagrams for explaining the structure of a 3D-shape measurement apparatus according to the fifth embodiment of the present invention. FIG. 12(a) shows the fundamental structure of a 3D-shape measurement apparatus defined in claim 20.

In FIG. 12(a), the photoreceptive optical system 90a shown in FIG. 1 is constituted by a prism 182 having a light-incident surface and a light-outgoing surface which are parallel to the main scanning direction 11, and the reflected light 8 of the spot light 6 enters into the prism 182 through point A on the light-incident surface 182a, and it is emitted from the prism 182 from point B on the light-outgoing surface 182b to be guided to the scanning convergence lens 3.

In this case, the position of the apparent light-emission point 13 moves because the reflected light 8 is refracted while traveling through the prism 182 and the radiation angle of the emitted light 8 changes. At the same time, since the reflected light 8 travels through the prism 182 having the refractive index n, when it is assumed that the traveling distance of the reflected light 8 in the prism 182 is t (=distance A-B) and the refractive index is n, the apparent light-emission point moves in the direction opposite to the scanning light traveling direction 40, as represented by the above-mentioned formula (30). The directions of the movements of the two apparent light-emission points cancel each other by appropriately selecting the angles and refractive indexes of the light-incident and light-outgoing surfaces of the prism 182 and the size of the prism 182. Thereby, it is possible to realize, with the single prism 182, an optical system which can achieve the following effects at the same time: the effect that the apparent light-emission point is positioned on the scanning plane 16, and the effect that the positional change of the light-emission point due to the positional change of the spot light 6 in the sub scanning direction can be made approximately constant.

Furthermore, FIG. 12(b) shows the fundamental structure of a 3D-shape measurement apparatus defined in claim 21.

In FIG. 12(b), the scanning light 4 is parallel to the main scanning direction 11, and it travels through parallel transparent surfaces 183c and 183d of a prism 183 at points C and D, respectively. Assuming that the distance between the points C and D is t and the refractive index of the prism 183 is n, a movement of the apparent scanning plane, which is the effect obtained by the two parallel glasses, occurs according to the above-mentioned formula (30), whereby the apparent scanning plane by the scanning light can be changed and, further, the positional change of the light-emission point due to the positional change of the spot light 6 in the sub scanning direction can be made approximately constant, resulting in a high degree of freedom in design The above-described 3D-shape measurement apparatus defined in claims 20 and 21 may be provided with a correction prism for reducing an aberration which occurs in the prism 182 or 183, as described for the 3D-shape measurement apparatus defined in claim 8, with the same effects as mentioned above.

Figure 13A:
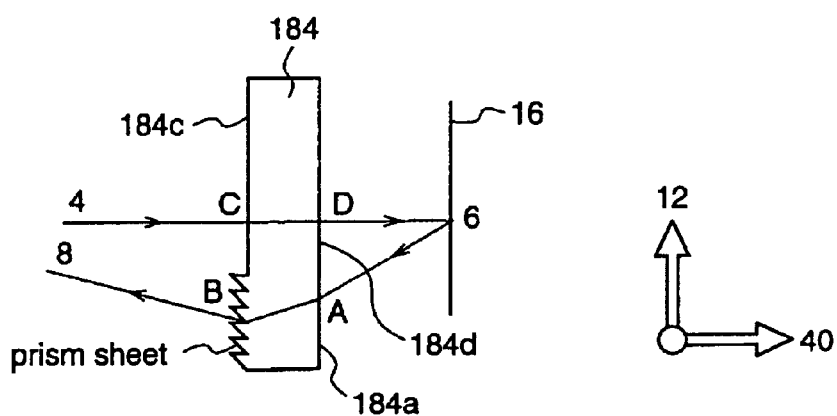
FIGS. 13(*a*) and 13(*b*) are diagrams for explaining the structure of the 3D-shape measurement apparatus according to the fifth embodiment, illustrating the case where the photoreceptive optical system is constituted by a prism sheet (13(*a*)), or a cylindrical lens (13(*b*)).
Figure 13B:
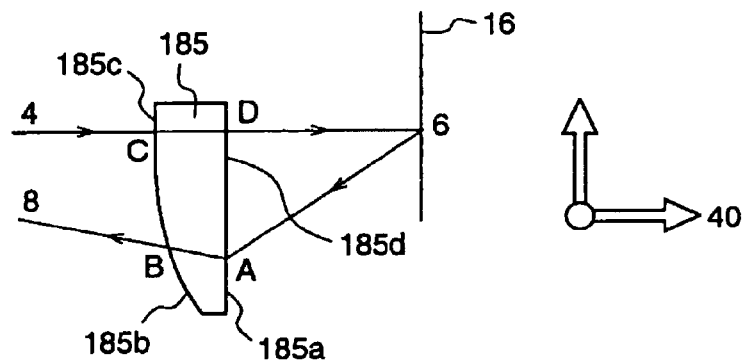
Figure 14:
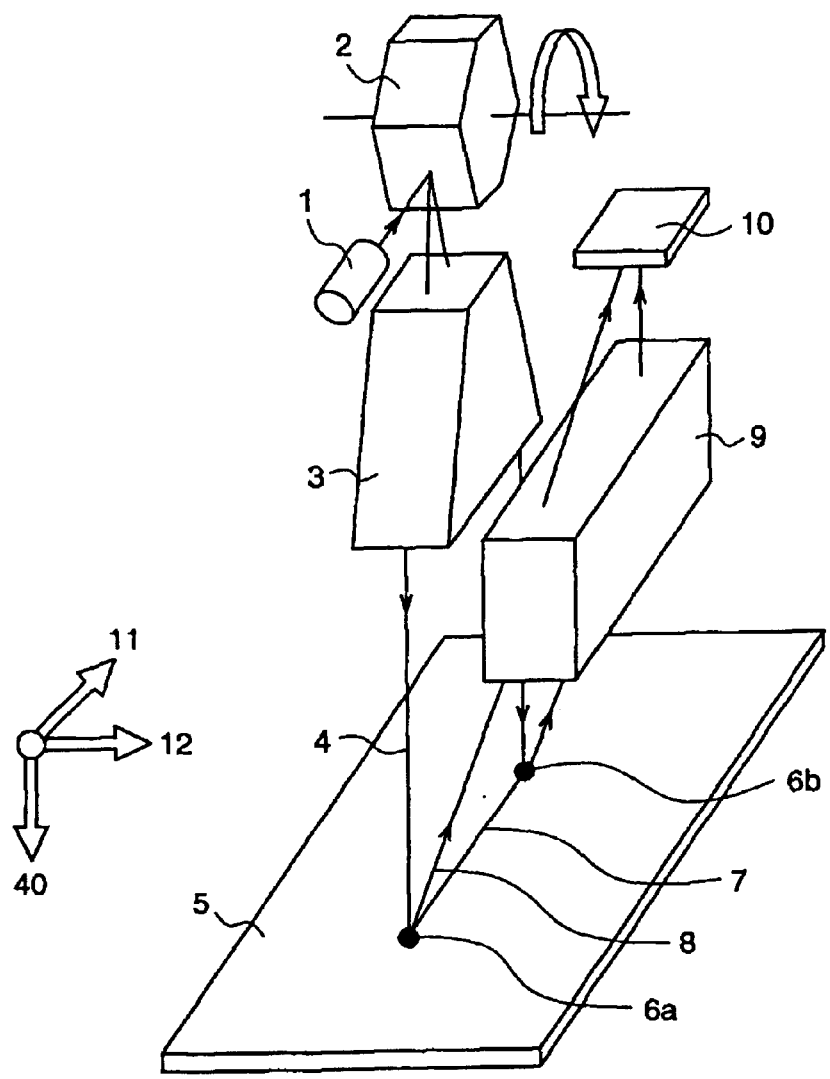
FIG. 14 is a perspective view illustrating the whole structure of a conventional 3D-shape measurement apparatus.
Figure 15A:
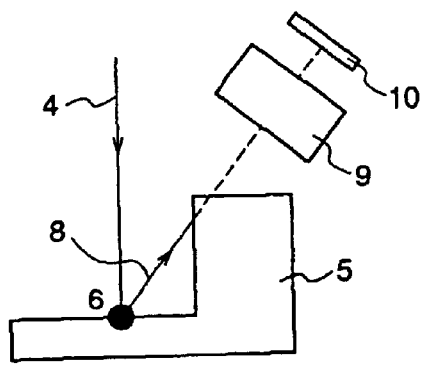
FIGS. 15(*a*)–15(*c*) are diagrams for explaining problems in height measurement by triangulation using the conventional 3D-shape measurement apparatus, illustrating the case where a blind spot occurs (15(*a*)), the case where an error occurs in a measured height due to multiple reflections (15(*b*)), and the case where the reflected light is measured from plural directions (15(*c*)).
Figure 15B:
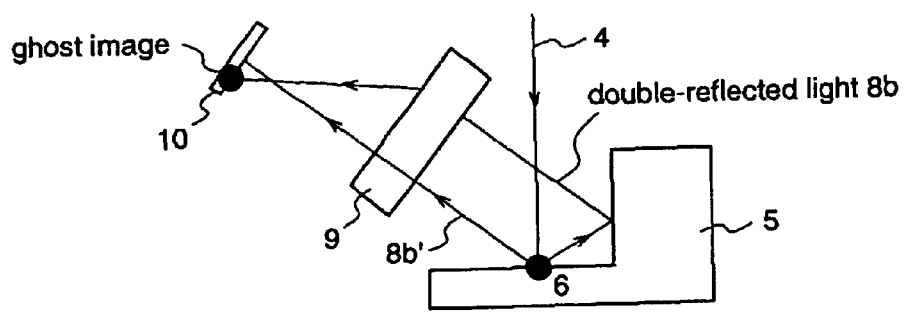
Figure 15C:
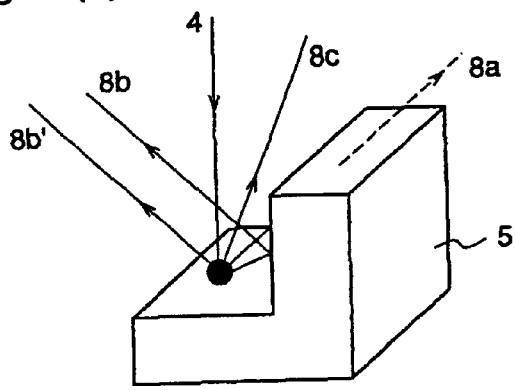
Figure 16:
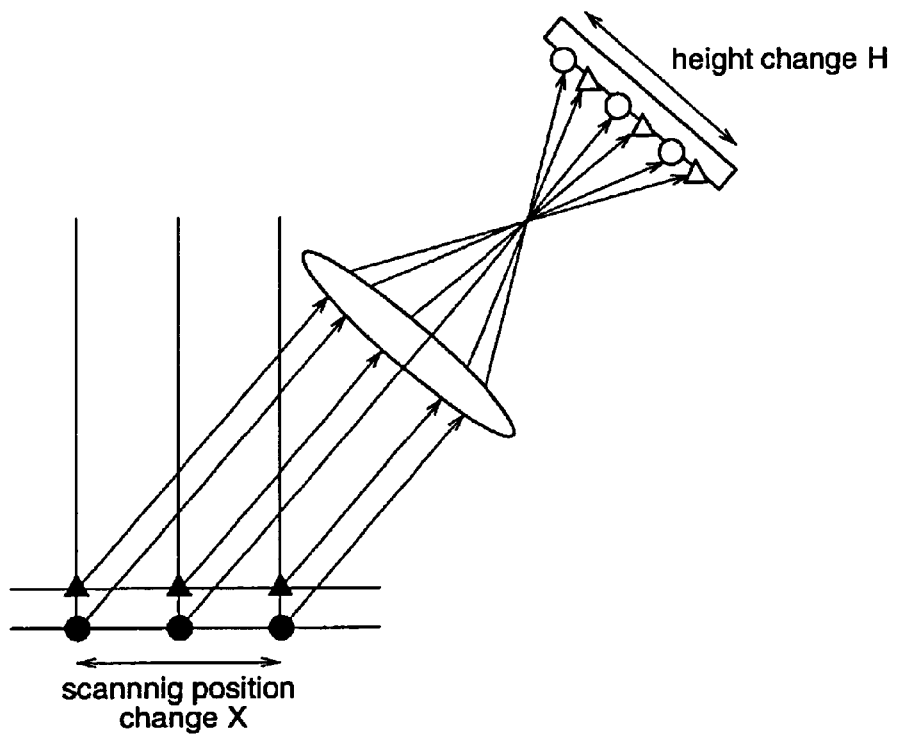
FIG. 16 is a cross-sectional view illustrating the relationship between a scanning position and a received image position in the conventional 3D-shape measurement apparatus.
Figure 17:
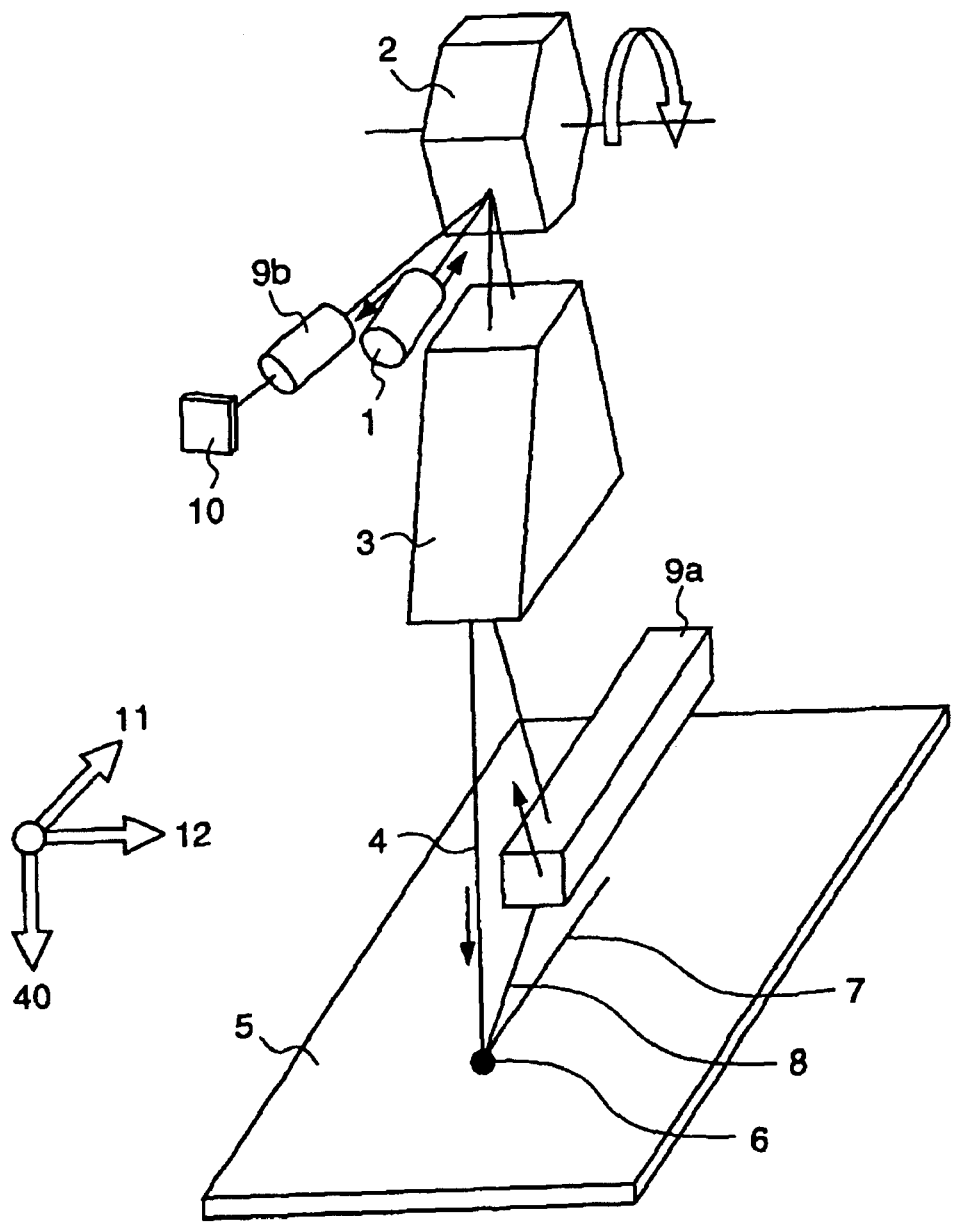
FIG. 17 is a perspective view illustrating the structure of the conventional 3D-shape measurement apparatus wherein a scanning optical system is included in a photoreceptive optical system.
Figure 18A:
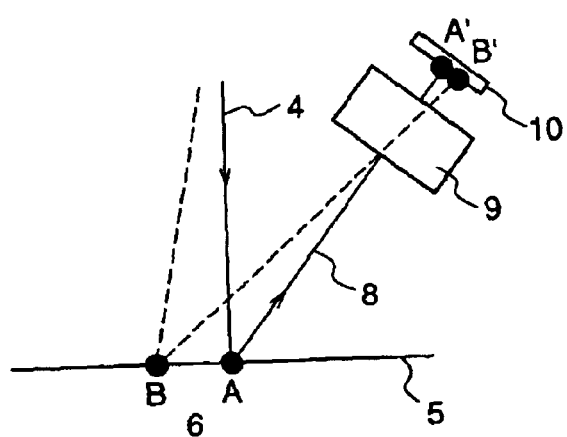
FIGS. 18(*a*) and 18(*b*) are diagrams for explaining a positional deviation of a spot light and a height error in the conventional 3D-shape measurement apparatus, illustrating the case where the reflected light is measured from one direction (18(*a*)), and the case where the reflected light is measured from plural directions (18(*b*)).
Figure 18B:
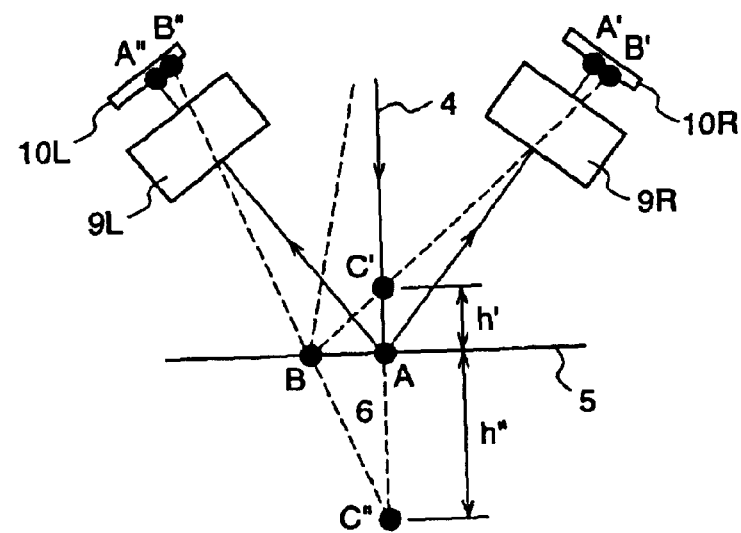
Figure 19:
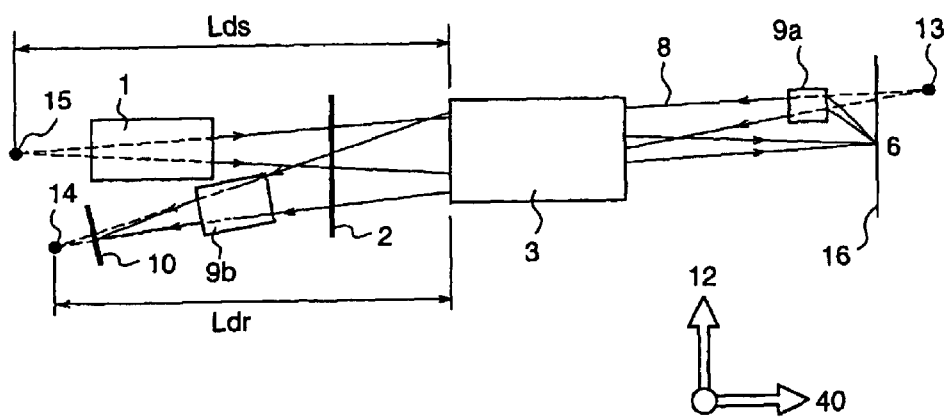
FIG. 19 is a diagram for explaining variations in height measurement accuracy according to the scanning position, in the conventional 3D-shape measurement apparatus.

FIGS. 13(*a*) and 13(*b*) are diagrams for explaining the structure of a 3D-shape measurement apparatus according to the fifth embodiment of the invention.

FIG. 13(*a*) shows the case where the prism which constitutes the photoreceptive optical system 90*a* shown in FIG. 12(*b*) is replaced with a prism sheet 184. Also in this case, like the 3D-shape measurement apparatus shown in FIG. 12(*b*), a movement of the apparent scanning plane, which is the effect obtained by the two parallel glasses, occurs, whereby the apparent scanning plane by the scanning light can be changed and further, the positional change of the light-emission point due to the positional change of the spot light 6 in the sub scanning direction can be made approximately constant, resulting in a high degree of freedom in design.

Also in the apparatus shown in FIG. 12(*a*), the prism 182 may be replaced with a prism sheet with the same effects as mentioned above.

FIG. 13(*b*) shows the fundamental structure of a 3D-shape measurement apparatus defined in claim 23, wherein the photoreceptive optical system 90*a* is constituted by a cylindrical lens 185 which extends in the main scanning direction 11.

In FIG. 13(*b*), the reflected light 8 of the spot light 6 enters into the cylindrical lens 185 through point A on a light-incident surface 185*b*, is refracted by the lens 185, and emitted from point B on a light-outgoing surface 185*b* of the cylindrical lens 185 to be guided to the scanning convergence lens 3. Further, the radiation angle of the reflected light 8 changes due to the power of the lens, and the apparent light-emission point is positioned on the apparent scanning plane, whereby an error of measured height, which is caused by a movement of the spot light 6 due to deformation of the scanning optical system, can be reduced as described for the 3D-shape measurement apparatus defined in claim 5. Furthermore, as described for the 3D-shape measurement apparatus defined in claim 17, when the apparent light-emission point of the reflected light is not positioned on the scanning plane, the position of the apparent emission point of the reflected light is moved with respect to the scanning plane so as to match the apparent emission point with the position of the scanning plane.

Furthermore, when the cylindrical lens 185 is integrated with parallel glasses through which the scanning light travels, the apparent scanning plane moves in the direction opposite to the scanning light traveling direction with respect to the actual scanning plane as described for the 3D-shape measurement apparatus defined in claim 13, whereby the apparent light-emission point can be positioned on the apparent scanning plane, resulting in a higher degree of freedom in design.

While in the above-description a reflected light beam traveling in one direction within a plane perpendicular to the main scanning direction is described as a representative example, the above-mentioned embodiments of the invention can be applied to a light beam which is obtained by projecting a reflected light beam on a plane perpendicular to the main scanning direction, which reflected light beam may be in any direction outside a plane drawn by the scanning light beam. Further, the above-described embodiments can be executed even when there are plural photoreceptive optical systems in different directions at the same time.

Furthermore, while in the above-mentioned embodiments the photoreceptive optical system is constituted by a single optical member, such as a prism, a cylindrical lens, a sheet prism, or the like, it may be constituted by a plurality of optical members.

What is claimed is:

1. A 3D-shape measurement apparatus which detects a reflected light obtained by irradiating an object as a target of measurement with a scanning light beam by employing an optical position detector, and measures the 3D-shape of the object from the result of detection at each scanning position, said apparatus comprising:
   means for generating a light beam;
   polarization scanning means for polarizing the light beam to make the light beam perform scanning;
   scanning convergence means for converging the light beam which has passed through the polarization scanning means; and
   reflected light path changing means for
      guiding the reflected light from the target object located on a locus (hereinafter referred to as a scanning line) which is drawn by a focal point of the light beam (hereinafter referred to as a scanning light beam) which has passed through the scanning convergence means, toward the scanning convergence means and the polarization scanning means, to make the reflected light incident on the optical position detector, and
      changing, when the object moves in a direction perpendicular to both of the scanning light beam and the scanning line (hereinafter referred to as a sub scanning direction), the optical path of the reflected light so that the direction of a movement of the image obtained by the optical position detector in the sub scanning direction becomes the same as the direction of the movement of the object, and the moving distance of the image becomes less than twice as long as the moving distance of the object.

2. The 3D-shape measurement apparatus of claim 1, wherein the reflected light path changing means is constituted by an even number of, at least two, mirrors which are placed parallel to the scanning line.

3. The 3D-shape measurement apparatus of claim 2, wherein the relationship of relative positions between the mirrors is always kept constant.

4. The 3D-shape measurement apparatus of claim 1, wherein the reflected light path changing means is constituted by a wedge-shaped prism having a light-incident surface and a light-emission surface which are parallel to the scanning line.

5. The 3D-shape measurement apparatus of claim 1, wherein the reflected light path changing means is constituted by a cylindrical lens which extends in the direction of the scanning line.

6. The 3D-shape measurement apparatus of claim 1, wherein the reflected light path changing means is constituted by a sheet-shaped optical element which refracts light.

7. The 3D-shape measurement apparatus of claim 3, wherein the even number of mirrors constituting the reflected light path changing means are formed at inner surfaces of a single prism body, and a correction prism for reducing an aberration of the image formed by focusing the reflected light on the optical position detector, is placed between the scanning convergence means and the optical position detector.

8. The 3D-shape measurement apparatus of claim 4, wherein a correction prism for reducing an aberration of the image formed by focusing the reflected light on the optical position detector, is placed between the scanning convergence means and the optical position detector.

9. The 3D-shape measurement apparatus of claim 5, wherein a cylindrical lens for reducing an aberration of the image formed by focusing the reflected light on the optical position detector, is placed between the scanning convergence means and the optical position detector.

10. A 3D-shape measurement apparatus which detects a reflected light that is obtained by irradiating an object as a target of measurement with a scanning light beam by employing an optical position detector, and measures the 3D-shape of the object from the result of detection at each scanning position, said apparatus comprising:

means for generating a light beam;

polarization scanning means for polarizing the light beam to make the light beam perform scanning;

scanning convergence means for converging the light beam which has passed through the polarization scanning means; and reflected light path changing means for
guiding the reflected light from the target object located on a locus (hereinafter referred to as a scanning line) which is drawn by a focal point of the light beam (hereinafter referred to as a scanning light beam) which has passed through the scanning convergence means, toward the scanning convergence means and the polarization scanning means, to make the reflected light incident on the optical position detector, and changing the optical path of the reflected light so that an apparent emission point of the reflected light incident on the scanning convergence means is always positioned on a plane (hereinafter referred to as a virtual scanning plane) which passes through a locus drawn by an apparent focal point of the scanning light beam emitted from the scanning convergence means and is perpendicular to the scanning light beam.

11. The 3D-shape measurement apparatus of claim 10 further including converging distance changing means for changing the converging distance of the scanning light beam, which means is placed in an optical path along which the scanning light beam passing through the scanning convergence means reaches the scanning plane.

12. The 3D-shape measurement apparatus of claim 11, wherein the converging distance changing means is constituted by at least three mirrors which are parallel to the scanning line.

13. The 3D-shape measurement apparatus of claim 11, wherein the converging distance changing means is constituted by parallel glasses having a light-incident surface and a light-emission surface which are parallel to the scanning line.

14. The 3D-shape measurement apparatus of claim 10 further including reflected light emission point distance changing means for changing the distance up to an apparent emission point of the reflected light, which means is placed in an optical path along which the reflected light from the target object reaches the scanning convergence means.

15. The 3D-shape measurement apparatus of claim 14, wherein the reflected light emission point distance changing means is constituted by at least three mirrors which are parallel to the scanning line.

16. The 3D-shape measurement apparatus of claim 14, wherein the reflected light emission point distance changing means is constituted by parallel glasses having a light-incident surface and a light-emission surface which are parallel to the scanning line.

17. The 3D-shape measurement apparatus of claim 14, wherein the reflected light emission point distance changing means is constituted by a cylindrical lens extending in the direction of the scanning line.

18. The 3D-shape measurement apparatus of claim 16, wherein the parallel glasses constituting the reflected light emission point distance changing means are provided with an even number of, at least two, mirrors at the inner surfaces, which mirrors are placed parallel to the scanning line, whereby the parallel glasses are integrated with each other.

19. The 3D-shape measurement apparatus of claim 18, wherein the integrated parallel glasses constituting the reflected light path changing means have a light-incident surface and a light-emission surface which are parallel to the scanning line and change the converging distance of the scanning light beam.

20. The 3D-shape measurement apparatus according to claim 4, wherein the reflected light emission point distance changing means for changing the distance up to the apparent emission point of the reflected light is integrated with the prism constituting the reflected light path changing means.

21. The 3D-shape measurement apparatus of claim 20, wherein the converging distance changing means, which comprises parallel glasses having a light-incident surface and a light-emission surface parallel to the scanning line and changes the converging distance of the scanning light beam, is integrated with the prism constituting the reflected light path changing means.

22. The 3D-shape measurement apparatus of claim 5, wherein the cylindrical lens constituting the reflected light path changing means is integrated with a reflected light emission point distance changing means which changes the distance up to an apparent emission point of the reflected light and is placed in an optical path along which the reflected light from the target object reaches the scanning convergence means.

23. The 3D-shape measurement apparatus of claim 22, wherein the cylindrical lens constituting the reflected light path changing means is integrated with a converging distance changing means which changes the converging distance of the scanning light beam and comprises parallel glasses having a light-incident surface and a light-emission surface parallel to the scanning line.

24. The 3D-shape measurement apparatus of claim 6, wherein a correction prism for reducing an aberration of the image formed by focusing the reflected light on the optical position detector, is placed between the scanning convergence means and the optical position detector.

25. The 3D-shape measurement apparatus according to claim 6, wherein the reflected light emission point distance changing means for changing the distance up to the apparent emission point of the reflected light is integrated with the prism constituting the reflected light path changing means.

26. The 3D-shape measurement apparatus according to claim 8, wherein the reflected light emission point distance changing means for changing the distance up to the apparent emission point of the reflected light is integrated with the prism constituting the reflected light path changing means.

27. The 3D-shape measurement apparatus of claim 25, wherein the converging distance changing means, which comprises parallel glasses having a light-incident surface and a light-emission surface parallel to the scanning line and changes the converging distance of the scanning light beam, is integrated with the prism constituting the reflected light path changing means.

28. The 3D-shape measurement apparatus of claim 26, wherein the converging distance changing means, which comprises parallel glasses having a light-incident surface and a light-emission surface parallel to the scanning line and changes the converging distance of the scanning light beam, is integrated with the prism constituting the reflected light path changing means.

* * * * *